United States Patent
Um et al.

(10) Patent No.: US 12,395,223 B2
(45) Date of Patent: Aug. 19, 2025

(54) METHOD AND APPARATUS FOR SIGNAL CONFIGURATION AND METHOD FOR SIGNAL TRANSMISSION

(71) Applicant: ELECTRONICS AND TELECOMMUNICATIONS RESEARCH INSTITUTE, Daejeon (KR)

(72) Inventors: Jung-Sun Um, Daejeon (KR); Sung-Ik Park, Daejeon (KR); Hoi-Yoon Jung, Daejeon (KR); Dong-Joon Choi, Daejeon (KR); Nam-Ho Hur, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 242 days.

(21) Appl. No.: 18/190,421

(22) Filed: Mar. 27, 2023

(65) Prior Publication Data

US 2023/0318679 A1   Oct. 5, 2023

(30) Foreign Application Priority Data

Mar. 29, 2022 (KR) .................. 10-2022-0038730
Feb. 3, 2023 (KR) .................. 10-2023-0014647

(51) Int. Cl.
H04B 7/02 (2018.01)
H04B 7/06 (2006.01)

(52) U.S. Cl.
CPC ........... *H04B 7/0669* (2013.01); *H04B 7/068* (2013.01); *H04B 7/0697* (2013.01)

(58) Field of Classification Search
CPC ..... H04B 7/0669; H04B 7/068; H04B 7/0697
USPC ......................................................... 375/267
See application file for complete search history.

(56) References Cited

U.S. PATENT DOCUMENTS

| | | | |
|---|---|---|---|
| 11,552,758 B2 | 1/2023 | Choi | |
| 2011/0075710 A1 | 3/2011 | Park | |
| 2011/0299382 A1* | 12/2011 | Van Nee | H04L 27/2613 370/210 |
| 2014/0153615 A1 | 6/2014 | Park | |
| 2018/0048366 A1* | 2/2018 | Sundararajan | H04B 7/0689 |
| 2022/0201529 A1* | 6/2022 | Chen | H04L 5/0091 |
| 2022/0408420 A1 | 12/2022 | Li | |

FOREIGN PATENT DOCUMENTS

| | | |
|---|---|---|
| KR | 10-2017-0134526 A | 12/2017 |
| KR | 10-2022-0087542 A | 6/2022 |

OTHER PUBLICATIONS

"ATSC Standard: Physical Layer Protocol", Advanced Television Systems Committee, A/322, Jan. 20, 2021.

* cited by examiner

*Primary Examiner* — Helene E Tayong

(57) ABSTRACT

Disclosed herein is a method for signal configuration. The method may include evenly dividing, by a signal-bit configuration block, data or information forming signal bits or a signal bitstring and transferring the same to N multiple channels; mapping, by a first spatial path configuration block, a coded bitstring, which is generated through coding and signal processing of the data or information forming the signal bits or the signal bitstring, to cells corresponding to M antennas; and configuring, by a frequency path configuration block, the transmission paths of the cells.

17 Claims, 26 Drawing Sheets

$$\begin{pmatrix} Out_{4i} \\ Out_{4i+1} \\ Out_{4i+2} \\ Out_{4i+3} \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} In_{4i} \\ In_{4i+1} \\ In_{4i+2} \\ In_{4i+3} \end{pmatrix} \quad \text{for (i mod 4) = 0}$$

$$\begin{pmatrix} Out_{4i} \\ Out_{4i+1} \\ Out_{4i+2} \\ Out_{4i+3} \end{pmatrix} = \begin{pmatrix} 0 & 1 & 0 & 0 \\ 0 & 0 & 1 & 0 \\ 0 & 0 & 0 & 1 \\ 1 & 0 & 0 & 0 \end{pmatrix} \cdot \begin{pmatrix} In_{4i} \\ In_{4i+1} \\ In_{4i+2} \\ In_{4i+3} \end{pmatrix} \quad \text{for (i mod 4) = 1}$$

$$\begin{pmatrix} Out_{4i} \\ Out_{4i+1} \\ Out_{4i+2} \\ Out_{4i+3} \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} In_{4i} \\ In_{4i+1} \\ In_{4i+2} \\ In_{4i+3} \end{pmatrix} \quad \text{for (i mod 4) = 2}$$

$$\begin{pmatrix} Out_{4i} \\ Out_{4i+1} \\ Out_{4i+2} \\ Out_{4i+3} \end{pmatrix} = \begin{pmatrix} 0 & 0 & 0 & 1 \\ 1 & 0 & 0 & 0 \\ 0 & 1 & 0 & 0 \\ 0 & 0 & 1 & 0 \end{pmatrix} \cdot \begin{pmatrix} In_{4i} \\ In_{4i+1} \\ In_{4i+2} \\ In_{4i+3} \end{pmatrix} \quad \text{for (i mod 4) = 3}$$

FIG. 6

$$\begin{pmatrix} \text{Out}_{4i} \\ \text{Out}_{4i+1} \\ \text{Out}_{4i+2} \\ \text{Out}_{4i+3} \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} \text{In}_{4i} \\ \text{In}_{4i+1} \\ \text{In}_{4i+2} \\ \text{In}_{4i+3} \end{pmatrix} \quad \text{for (i mod 4) = 0} \qquad F_0 = \begin{pmatrix} 1 & 0 & 0 & 0 \\ 0 & 1 & 0 & 0 \\ 0 & 0 & 1 & 0 \\ 0 & 0 & 0 & 1 \end{pmatrix} ,$$

$$\begin{pmatrix} \text{Out}_{4i} \\ \text{Out}_{4i+1} \\ \text{Out}_{4i+2} \\ \text{Out}_{4i+3} \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} \text{In}_{4i} \\ \text{In}_{4i+1} \\ \text{In}_{4i+2} \\ \text{In}_{4i+3} \end{pmatrix} \quad \text{for (i mod 4) = 1} \qquad F_1 = \begin{pmatrix} 0 & 0 & 1 & 0 \\ 0 & 0 & 0 & 1 \\ 1 & 0 & 0 & 0 \\ 0 & 1 & 0 & 0 \end{pmatrix} ,$$

$$\begin{pmatrix} \text{Out}_{4i} \\ \text{Out}_{4i+1} \\ \text{Out}_{4i+2} \\ \text{Out}_{4i+3} \end{pmatrix} = \begin{pmatrix} 0 & 1 & 0 & 0 \\ 1 & 0 & 0 & 0 \\ 0 & 0 & 0 & 1 \\ 0 & 0 & 1 & 0 \end{pmatrix} \cdot \begin{pmatrix} \text{In}_{4i} \\ \text{In}_{4i+1} \\ \text{In}_{4i+2} \\ \text{In}_{4i+3} \end{pmatrix} \quad \text{for (i mod 4) = 2} \qquad F_2 = \begin{pmatrix} 0 & 1 & 0 & 0 \\ 1 & 0 & 0 & 0 \\ 0 & 0 & 0 & 1 \\ 0 & 0 & 1 & 0 \end{pmatrix} ,$$

$$\begin{pmatrix} \text{Out}_{4i} \\ \text{Out}_{4i+1} \\ \text{Out}_{4i+2} \\ \text{Out}_{4i+3} \end{pmatrix} = \begin{pmatrix} 0 & 0 & 0 & 1 \\ 0 & 0 & 1 & 0 \\ 0 & 1 & 0 & 0 \\ 1 & 0 & 0 & 0 \end{pmatrix} \cdot \begin{pmatrix} \text{In}_{4i} \\ \text{In}_{4i+1} \\ \text{In}_{4i+2} \\ \text{In}_{4i+3} \end{pmatrix} \quad \text{for (i mod 4) = 3} \qquad F_3 = \begin{pmatrix} 0 & 0 & 0 & 1 \\ 0 & 0 & 1 & 0 \\ 0 & 1 & 0 & 0 \\ 1 & 0 & 0 & 0 \end{pmatrix} .$$

FIG. 7

$$\begin{pmatrix} \text{Out}_{4i} \\ \text{Out}_{4i+1} \\ \text{Out}_{4i+2} \\ \text{Out}_{4i+3} \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} \text{In}_{4i} \\ \text{In}_{4i+1} \\ \text{In}_{4i+2} \\ \text{In}_{4i+3} \end{pmatrix} \quad \text{for even i or (i mod 2) = 0}$$

$$\begin{pmatrix} \text{Out}_{4i} \\ \text{Out}_{4i+1} \\ \text{Out}_{4i+2} \\ \text{Out}_{4i+3} \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} \text{In}_{4i} \\ \text{In}_{4i+1} \\ \text{In}_{4i+2} \\ \text{In}_{4i+3} \end{pmatrix} \quad \text{for odd i or (i mod 2) = 1}$$

FIG. 8

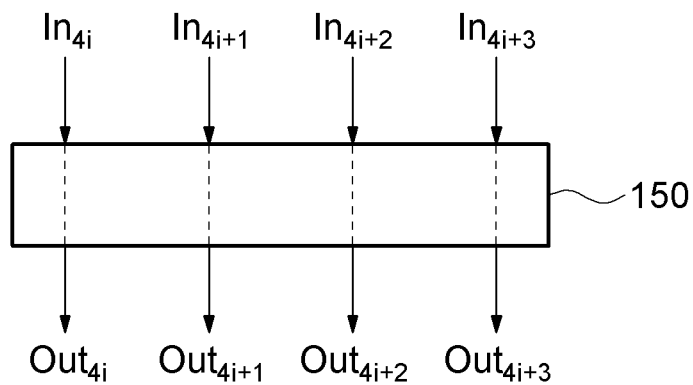

FIG. 9

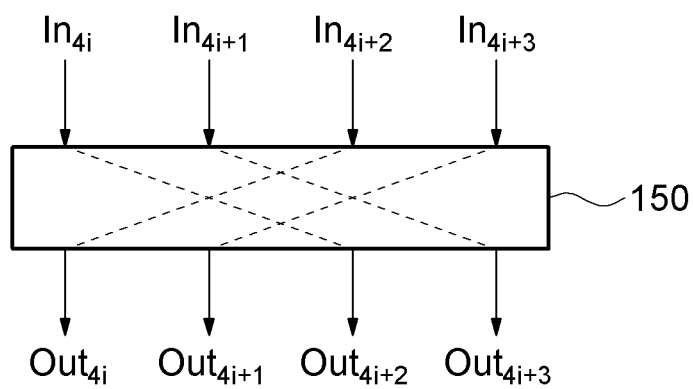

FIG. 10

$$\begin{pmatrix} Out_{4i} \\ Out_{4i+1} \\ Out_{4i+2} \\ Out_{4i+3} \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} In_{4i} \\ In_{4i+1} \\ In_{4i+2} \\ In_{4i+3} \end{pmatrix} \quad \text{for even i or (i mod 2) = 0}$$

$$\begin{pmatrix} Out_{4i} \\ Out_{4i+1} \\ Out_{4i+2} \\ Out_{4i+3} \end{pmatrix} = \begin{pmatrix} 1 & 0 & 0 & 0 \\ 0 & 0 & 1 & 0 \\ 0 & 1 & 0 & 0 \\ 0 & 0 & 0 & 1 \end{pmatrix} \cdot \begin{pmatrix} In_{4i} \\ In_{4i+1} \\ In_{4i+2} \\ In_{4i+3} \end{pmatrix} \quad \text{for odd i or (i mod 2) = 1}$$

FIG. 11

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 0$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 1 & 0 & 0 \\ 0 & 0 & 1 & 0 \\ 0 & 0 & 0 & 1 \\ 1 & 0 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 1$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 2$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 0 & 1 \\ 1 & 0 & 0 & 0 \\ 0 & 1 & 0 & 0 \\ 0 & 0 & 1 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 3$$

FIG. 20

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 0$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 1$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 1 & 0 & 0 \\ 1 & 0 & 0 & 0 \\ 0 & 0 & 0 & 1 \\ 0 & 0 & 1 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 2$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 0 & 1 \\ 0 & 0 & 1 & 0 \\ 0 & 1 & 0 & 0 \\ 1 & 0 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for } (i \bmod 4) = 3$$

FIG. 21

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 0}$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 1 & 0 & 0 \\ 0 & 0 & 1 & 0 \\ 0 & 0 & 0 & 1 \\ 1 & 0 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 1}$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 2}$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 0 & 1 \\ 1 & 0 & 0 & 0 \\ 0 & 1 & 0 & 0 \\ 0 & 0 & 1 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 3}$$

FIG. 27

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 0}$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 1 & 0 \\ 0 & 0 & 0 & 1 \\ 1 & 0 & 0 & 0 \\ 0 & 1 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 1}$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 1 & 0 & 0 \\ 1 & 0 & 0 & 0 \\ 0 & 0 & 0 & 1 \\ 0 & 0 & 1 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 2}$$

$$\begin{pmatrix} g_{2i,1}(Tx1) \\ g_{2i+1,1}(Tx2) \\ g_{2i,2}(Tx3) \\ g_{2i+1,2}(Tx4) \end{pmatrix} = \begin{pmatrix} 0 & 0 & 0 & 1 \\ 0 & 0 & 1 & 0 \\ 0 & 1 & 0 & 0 \\ 1 & 0 & 0 & 0 \end{pmatrix} \cdot \begin{pmatrix} X_{2i,1}(Tx1) \\ X_{2i+1,1}(Tx2) \\ X_{2i,2}(Tx3) \\ X_{2i+1,2}(Tx4) \end{pmatrix} \text{ for (i mod 4) = 3}$$

FIG. 28

| value | Meaning |
| --- | --- |
| 00 | Plain channel bonding |
| 01 | SNR averaged channel bonding |
| 10 | SNR averaged MIMO channel bonding |
| 11 | Reserved |

FIG. 29

| value | Meaning |
|---|---|
| 000 | Plain channel bonding |
| 001 | SNR averaged channel bonding |
| 010 | SNR averaged MIMO channel bonding - option1 |
| 011 | SNR averaged MIMO channel bonding - option2 |
| 100 | SNR averaged MIMO channel bonding - option3 |
| 101~111 | Reserved |

| L1D_plp_bonded_rf_id [abc] | METHOD |
|---|---|
| 00x | Option-1 |
| 01x | Option-2 |
| 10x | Option-3 |
| 11x | Option-4 |

METHOD AND APPARATUS FOR SIGNAL CONFIGURATION AND METHOD FOR SIGNAL TRANSMISSION

CROSS REFERENCE TO RELATED APPLICATIONS

This application claims the benefit of Korean Patent Applications No. 10-2022-0038730, filed Mar. 29, 2022, and No. 10-2023-0014647, filed Feb. 3, 2023, which are hereby incorporated by reference in their entireties into this application.

BACKGROUND OF THE INVENTION

1. Technical Field

The present disclosure relates to a method and apparatus for signal configuration and a method for signal transmission in a signal transmission apparatus configured with multiple channels and multiple antennas in order to configure the frequency paths and spatial paths of the wireless channels and antennas through which signals are transmitted.

2. Description of the Related Art

A broadcast system based on the ATSC 3.0 standard may configure one or more transmission channels or use one or more transmission antennas. In order to increase the transmission speed, configuration technology for effectively mixing and combining multiple channels and multiple antennas for transmission of a media stream or data is required. Particularly, a method for configuring physical-layer signals or assigning the same to multiple wireless channels and multiple antennas is required to be defined such that sufficient wireless channel diversity is obtained. With regard to the physical-layer technology applied to signal transmission of a broadcast system, control information is signaled to a reception apparatus such that the reception apparatus is able to demodulate a signal. When a configuration method for transmitting signals using both multiple channels and multiple antennas is required to be transferred to the reception apparatus, a method for signaling information thereabout has to be defined.

This description on the related arts is written for understanding of the background of the present disclosure, and may include content other than conventional technology already known to those skilled in the art to which the technology of the present disclosure pertains.

SUMMARY OF THE INVENTION

An object of the present disclosure is to provide technology for signal-processing or a method for configuring frequency paths and spatial paths of a channel and an antenna through which a signal is transmitted.

Another object of the present disclosure is to propose a method for transferring or signaling control information for a signal configuration method.

In order to accomplish the above objects, a method for signal configuration according to the present disclosure may include evenly dividing, by a signal-bit configuration block, data or information forming signal bits or a signal bitstring and transferring the same to N multiple channels; mapping, by a first spatial path configuration block, a coded bitstring, which is generated through coding and signal processing of the data or information forming the signal bits or the signal bitstring, to cells corresponding to M antennas; and configuring, by a frequency path configuration block, the transmission paths of the cells.

The method may further include changing, by a second spatial path configuration block, the M cells, to which the coded bitstring is mapped by the first spatial path configuration block, to recombined cells or signal-processed cells.

Otherwise, the method may further include changing, by a second spatial path configuration block, cells output by the frequency path configuration block to recombined cells or signal-processed cells.

Cells input to the frequency path configuration block may be connected with cells output therefrom in a one-to-one manner.

The frequency path configuration block may comprise a number of frequency path configuration blocks equal to the number of second spatial path configuration blocks.

The second spatial path configuration block may recombine the cells by combining the in-phase components and the quadrature components of the cells when M is 2.

Cells input to the frequency path configuration block may be transmitted on different wireless channels.

Also, an apparatus for signal configuration according to an embodiment includes memory in which a control program for signal configuration is stored and a processor for executing the control program stored in the memory. The processor may evenly divide data or information forming signal bits or a signal bitstring and transfer the same to N multiple channels using a signal-bit configuration block, map a coded bitstring, which is generated through coding and signal processing of the data or information forming the signal bits or the signal bitstring, to cells corresponding to M antennas using a first spatial path configuration block, and configure the transmission paths of the cells using a frequency path configuration block.

The processor may change the M cells, to which the coded bitstring is mapped by the first spatial path configuration block, to recombined cells or signal-processed cells using a second spatial path configuration block.

Otherwise, the processor may change cells output by the frequency path configuration block to recombined cells or signal-processed cells using a second spatial path configuration block.

Cells input to the frequency path configuration block may be connected with cells output therefrom in a one-to-one manner.

The processor may configure the frequency path configuration block so as to comprise a number of frequency path configuration blocks equal to the number of second spatial path configuration blocks.

The processor may recombine the cells by combining the in-phase components and the quadrature components of the cells when M is 2.

The processor may configure the frequency path configuration block such that cells input thereto are transmitted on different wireless channels.

Also, a method for signal transmission according to an embodiment may include configuring a transmission signal in such a way that a signal-bit configuration block evenly divides data or information forming signal bits or a signal bitstring and transfers the same to N multiple channels, a first spatial path configuration block maps a coded bitstring, which is generated through coding and signal processing of the data or information forming the signal bits or the signal bitstring, to cells corresponding to M antennas, and a frequency path configuration block configures the transmission paths of the cells; and transmitting the configuration of the transmission signal to a reception apparatus using a control message or control information.

The method may further include changing, by a second spatial path configuration block, the M cells, to which the coded bitstring is mapped by the first spatial path configuration block, to recombined cells or signal-processed cells.

The method may further include changing, by a second spatial path configuration block, cells output by the frequency path configuration block to recombined cells or signal-processed cells.

Cells input to the frequency path configuration block may be connected with cells output therefrom in a one-to-one manner.

The frequency path configuration block may comprise a number of frequency path configuration blocks equal to the number of second spatial path configuration blocks.

The second spatial path configuration block may recombine the cells by combining the in-phase components and the quadrature components of the cells when M is 2.

BRIEF DESCRIPTION OF THE DRAWINGS

The above and other objects, features, and advantages of the present disclosure will be more clearly understood from the following detailed description taken in conjunction with the accompanying drawings, in which:

FIG. 6 is a view illustrating matrices that are defined when P is 4;

FIG. 7 is a view illustrating the definitions of $F_0$, $F_1$, $F_2$, and $F_3$ when P is 4;

FIG. 8 is a view illustrating an embodiment for defining two matrices in an embedment in which P is 4;

FIG. 9 is a view illustrating the mapping between input and output or a structural definition in addition to the definition of a matrix when P is 4 and i is an even number;

FIG. 10 is view illustrating the mapping between input and output or a structural definition in addition to the definition of a matrix when P is 4 and i is an odd number;

FIG. 11 is a view illustrating an embodiment for defining two matrices in an embodiment in which P is 2;

FIG. 20 is a view illustrating an embodiment in which a configuration is determined depending on a frequency path configuration block capable of having four inputs and outputs in a signal configuration apparatus based on a first combination of configuration blocks;

FIG. 21 is a view illustrating another embodiment in which a configuration is determined depending on a frequency path configuration block capable of having four inputs and outputs in a signal configuration apparatus based on a first combination of configuration blocks;

FIG. 27 is a view illustrating an embodiment in which a configuration is determined depending on a frequency path configuration block capable of having four inputs and outputs in a signal configuration apparatus based on a second combination of configuration blocks;

FIG. 28 is a view illustrating another embodiment in which a configuration is determined depending on a frequency path configuration block capable of having four inputs and outputs in a signal configuration apparatus based on a second combination of configuration blocks;

FIG. 29 is a view for explaining bits indicating a signaling method according to an embodiment;

DESCRIPTION OF THE PREFERRED EMBODIMENTS

Figure 1:
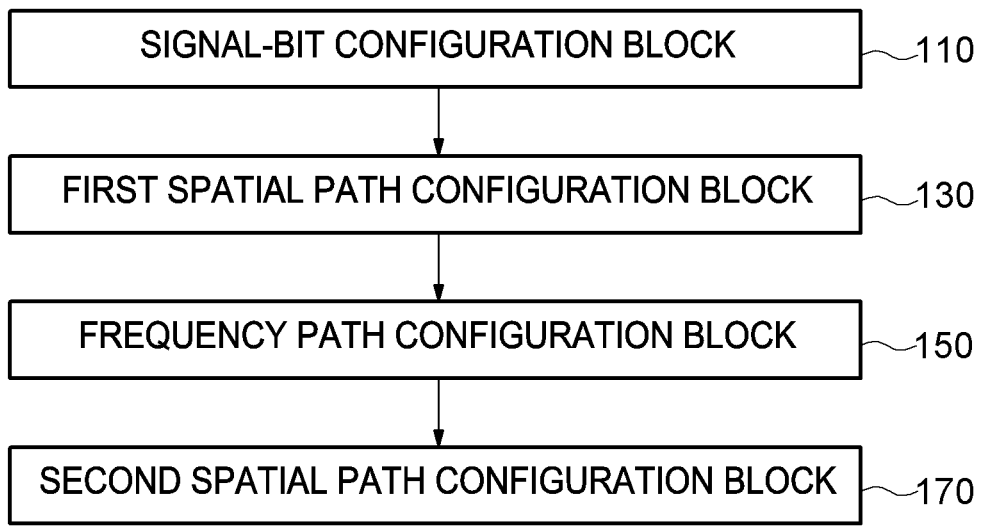
FIG. 1 is a block diagram illustrating an apparatus for signal configuration based on a first combination of configuration blocks according to an embodiment of the present disclosure.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

The present disclosure may provide a method and apparatus for signal processing in order to configure a combined path of the frequency path and the spatial path of a wireless channel or a Radio Frequency (RF) channel through which transmission information, such as information, streams, data, packets, and the like, is transmitted.

The bits (bitstring) of the transmission information may be formed of coded bits (bitstring) through channel encoding.

The coded bits (bitstring) may be mapped to a constellation point on an in-phase and quadrature coordinate system or to a cell depending on the bitstring configured with a tuple or m units. In the present disclosure, the target to which the coded bitstring is mapped may be defined as a cell. In the present disclosure, a block for performing signal-processing for mapping to a cell may be defined as a mapper.

The present disclosure may provide technology for configuring a frequency path and a spatial path for transferring information bits or a cell in a wireless manner.

When one or more multi-antennas are present, a block for mapping a coded bitstring to a cell may be configured. The corresponding block may be referred to as a "Multiple-Input Multiple-Output Mapper (MIMO MAP)". Here, the MIMO MAP is referred to as a first spatial path configuration block.

The cell classified by the "first spatial path configuration block" may be changed to a newly combined or signal-processed cell by a "second spatial path configuration block". The "second spatial path configuration block" may be referred to as a "MIMO precoder". The "second spatial path configuration block" may be enabled or disabled depending on transmission conditions. When the "second spatial path configuration block" is disabled, the function thereof or signal-processing thereby is not performed.

A wireless link for transmitting signals, such as a Radio Frequency (RF), a wireless channel, and the like, may be formed of one or more multi-RFs. In the present disclosure, this is referred to as "multiple channels". The "multiple channels" may be adjacent frequencies or channels, or may be different bands. For example, they may be a Very-High Frequency (VHS) channel and a Ultra-High Frequency (UHF) channel.

When it is possible to configure multiple channels, information bits to be transferred to the multiple channels may be classified or configured. The block for performing this function or signal-processing is referred to as a "signal-bit configuration block" in the present disclosure. The "signal-bit configuration block" may be referred to as "streaming partitioning block".

When it is possible to configure multiple channels, a block for configuring the transmission path of a cell is referred to as a "frequency path configuration block". The "frequency path configuration block" may be referred to as "cell exchange block".

Depending on the positions of the configuration blocks and a combination of the functions thereof, the signal configuration apparatus of the present disclosure is defined as "a first combination of configuration blocks" or "a second combination of configuration blocks".

FIG. 1 is a block diagram illustrating a signal configuration apparatus based on a first combination of configuration blocks according to an embodiment of the present disclosure.

Referring to FIG. 1, the signal configuration apparatus 100 based on a first combination of configuration blocks may include a signal-bit configuration block 110, a first spatial path configuration block 130, a frequency path configuration block 150, and a second spatial path configuration block 170.

The frequency path configuration block 150 may be formed or located after the first spatial path configuration block 130. The second spatial path configuration block 170 may be formed or located after the frequency path configuration block 150.

Between the respective configuration blocks, other signal-processing functions or blocks independent of path configuration may be formed.

Figure 2:
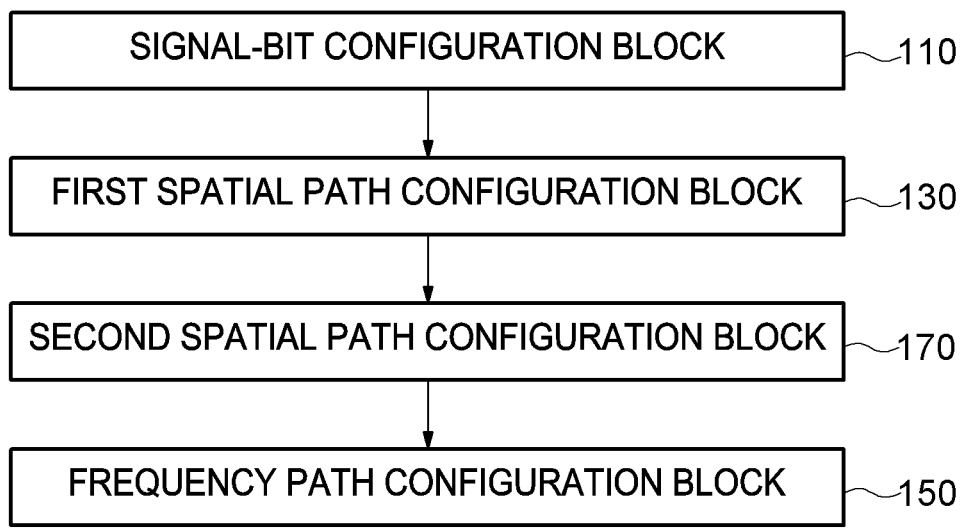
FIG. 2 is a block diagram illustrating an apparatus for signal configuration based on a second combination of configuration blocks according to an embodiment of the present disclosure.

FIG. 2 is a block diagram illustrating a signal configuration apparatus based on a second combination of configuration blocks according to an embodiment of the present disclosure.

Referring to FIG. 2, the signal configuration apparatus 200 based on a second combination of configuration blocks may include a signal-bit configuration block 110, a first spatial path configuration block 130, a second spatial path configuration block 170, and a frequency path configuration block 150.

The frequency path configuration block 150 may be formed or located after the first spatial path configuration block 130 and the second spatial path configuration block 170.

Between the respective configuration blocks, other signal-processing functions or blocks independent of path configuration may be formed.

Figure 3:
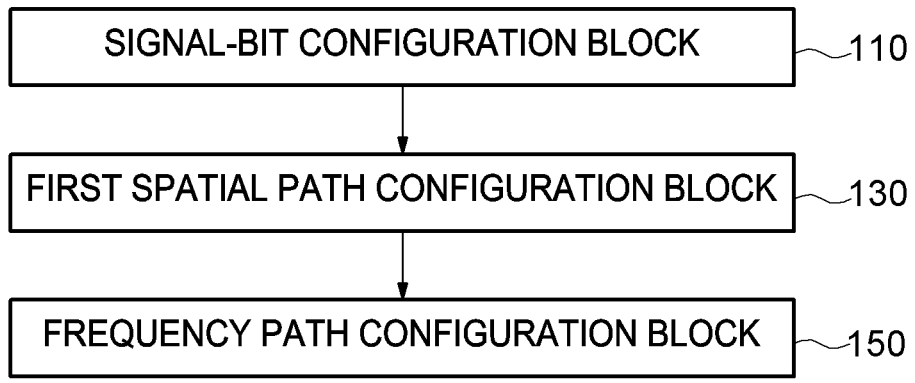
FIG. 3 is a block diagram illustrating an apparatus for signal configuration based on a configuration block combination in which a second spatial path configuration block is disabled according to an embodiment of the present disclosure.

FIG. 3 is a block diagram illustrating a signal configuration apparatus based on a combination of configuration blocks in which a second spatial path configuration block is disabled according to an embodiment of the present disclosure.

Referring to FIG. 3, the signal configuration apparatus 300 may include a signal-bit configuration block 110, a first spatial path configuration block 130, and a frequency path configuration block 150.

The frequency path configuration block 150 may be located or formed after the first spatial path configuration block 130. The second spatial path configuration block may be disabled.

Figure 4:
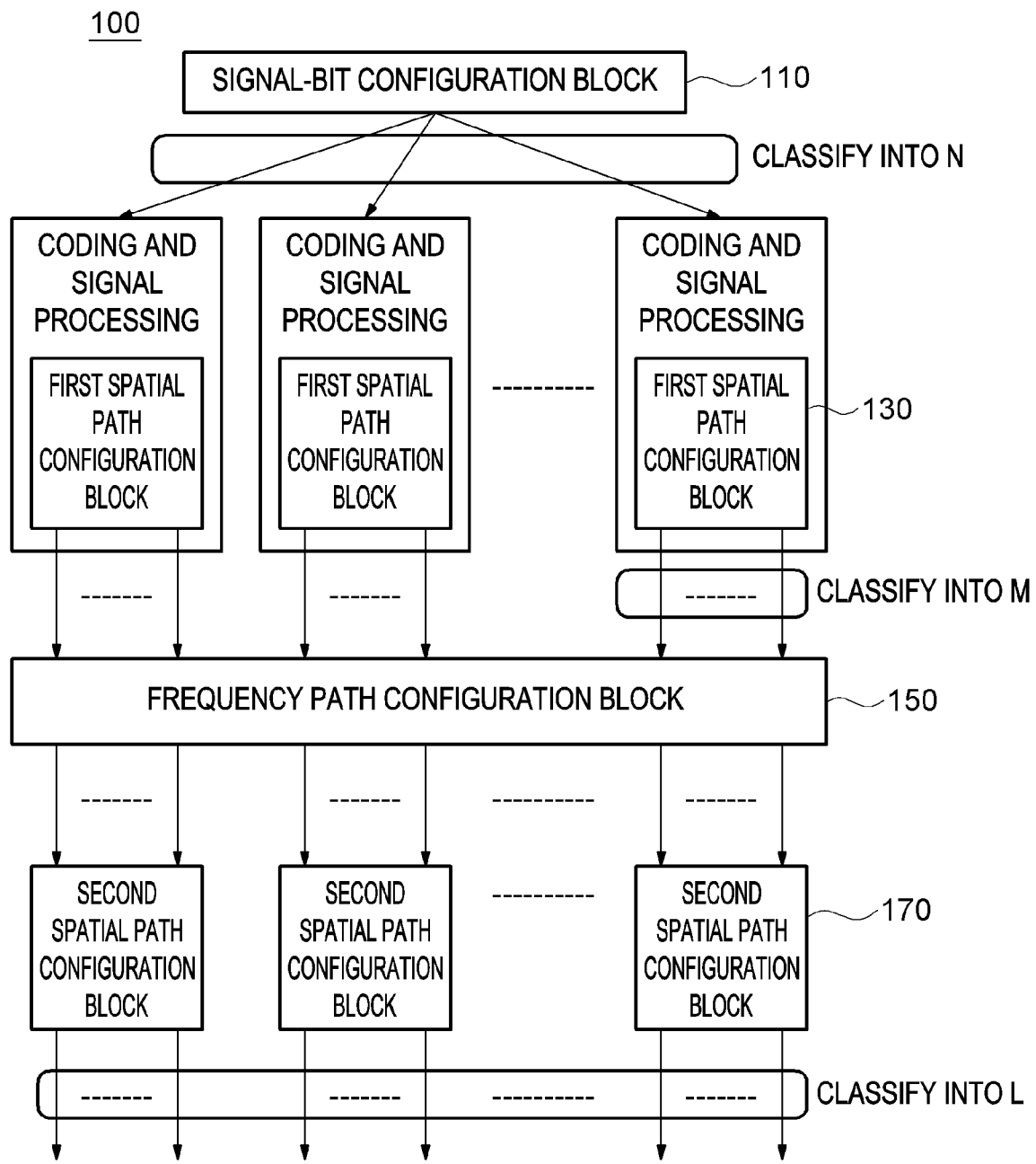
FIG. 4 is a block diagram illustrating an apparatus for signal configuration based on a first combination of configuration blocks when N multiple channels are configured and M antennas are configured for each channel.
Figure 5:
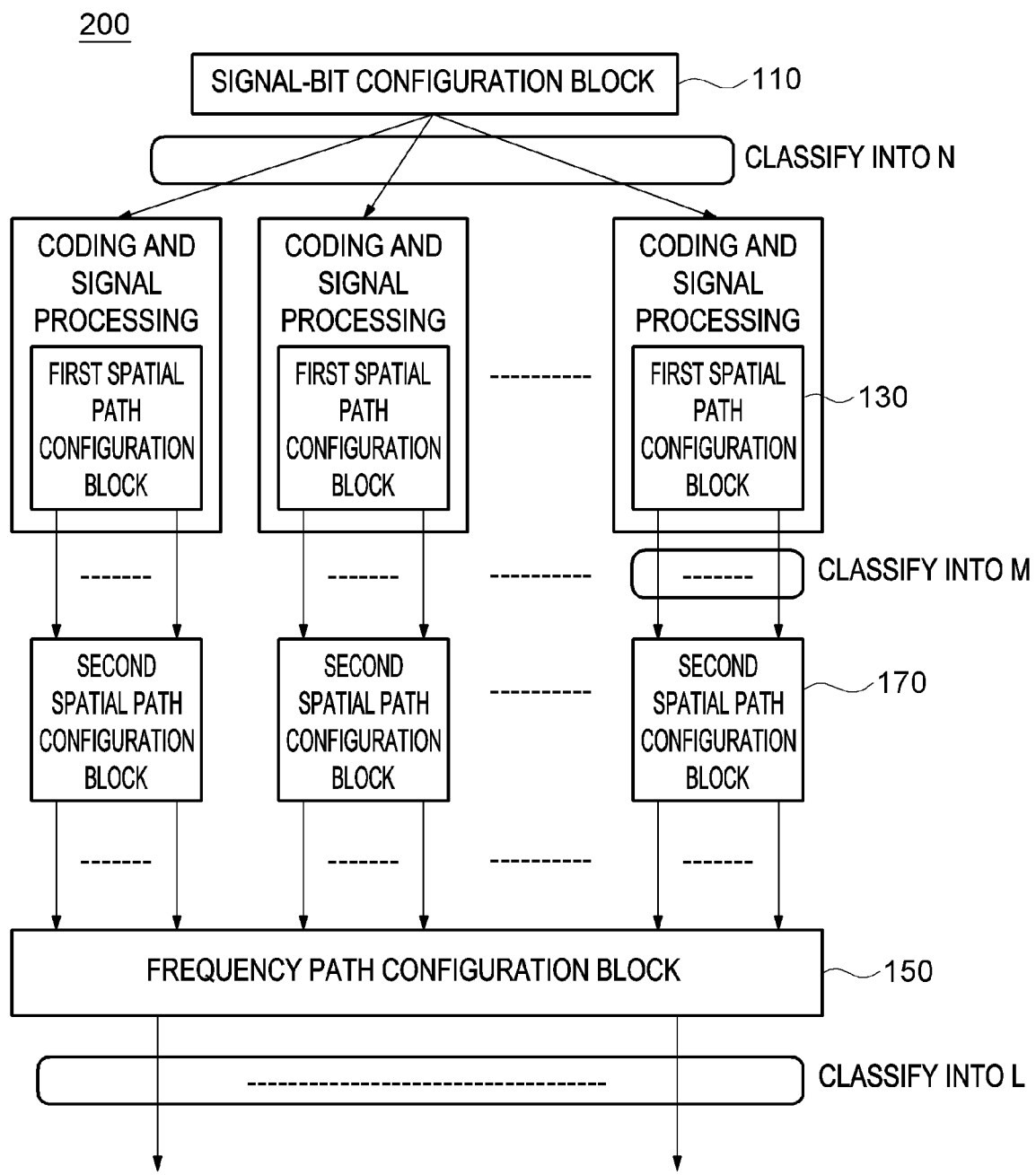
FIG. 5 is a block diagram illustrating an apparatus for signal configuration based on a second combination of configuration blocks when N multiple channels are configured and M antennas are configured for each channel.

FIG. 4 is a block diagram illustrating a signal configuration apparatus based on a first combination of configuration blocks when N multiple channels are configured and M antennas are configured for each channel, and FIG. 5 is a block diagram illustrating a signal configuration apparatus based on a second combination of configuration blocks when N multiple channels are configured and M antennas are configured for each channel.

Referring to FIG. 4 and FIG. 5, when M antennas are configured for each channel, the M antennas may be physically shared in each of N channels. In this case, the total number of antennas may be M, but (N*M) paths have to be configured as paths for signal processing. Here, L becomes (N*M). When the antennas are individually configured for the respective signal-processing paths, rather than being physically shared, the total number of antennas is (N*M). Here, L becomes (N*M). Here, the signal-processing path may include one or more of digital signal processing, analog signal processing, baseband signal processing, Intermediate Frequency (IF) signal processing, or RF signal processing, or a combination thereof.

The signal-bit configuration block 110 evenly divides data or information forming signal bits or a signal bitstring by a designated signal-processing packet size. As an embodiment, information defined as a physical link packet or a data packet constitutes a signal bitstring, and is evenly divided so as to be sequentially assigned to the N multiple channels, after which a header may be added to each of the packets acquired by division.

In the first spatial path configuration block 130, the bitstring may be sequentially classified and configured depending on the number of antennas, M. As an embodiment, when M is 2, it may be classified as an even-numbered index of a bitstring and an odd-numbered index of a bitstring.

In the second spatial path configuration block 170, M cells may be formed by being combined with each other.

When M is 2, the in-phase components and the quadrature components of the cells, which are represented as complex numbers, may be combined. As an embodiment, the in-phase components of the two cells may constitute the in-phase component and quadrature component of a new cell, and the quadrature components of the two cells may constitute the in-phase component and quadrature component of an additional new cell. As another embodiment, the in-phase component of the first cell and the quadrature component of the second cell may respectively constitute the in-phase component and the quadrature component of a new cell, and the quadrature component of the first cell and the in-phase component of the second cell may respectively constitute the quadrature component and the in-phase component of an additional new cell. As a further embodiment, when M is 2, new cells may be formed of a combination of phase-modulated two complex-number symbols of the cells. An embodiment of the combination of the phase-modulated symbols is as shown in Equation (1) below:

$$\begin{bmatrix} \text{new } 1st \text{ Cell} \\ \text{new } 2nd \text{ Cell} \end{bmatrix} = \begin{bmatrix} \cos\theta & \sin\theta \\ \sin\theta & -\cos\theta \end{bmatrix} \begin{bmatrix} 1st \text{ Cell} \\ 2nd \text{ Cell} \end{bmatrix} \quad (1)$$

The frequency path configuration block 150 maps the input port indices of the multiple cells input thereto to the output port indices depending on the configuration of the frequency path configuration block 150. One of the functions of the frequency path configuration block 150, which changes cells so as to be assigned to different wireless channels, is to obtain channel diversity gain. Accordingly, a method for distributing M cells, transferred from the first or second spatial path configuration block, across N wireless channels is required. The frequency path configuration block 150 may be defined as the one-to-one connection between input cells and output cells.

As shown in FIG. 4 or FIG. 5, the location of the second spatial path configuration block 170 in the first combination of configuration blocks may differ from that in the second combination of configuration blocks.

One or more configuration methods may be defined as methods for configuring the frequency path configuration block 150. Also, among the defined configuration methods, two or more methods may be sequentially selected or selected depending on certain conditions, a defined sequence, or a defined pattern. Here, the unit for which one of the configuration methods is selected and applied may be a cell set or a number of cells that arrive(s) at the input end of the frequency path configuration block 150. Here, when the number of cells input to the second spatial path configuration block 170 is X and when P cells at the i-th time point are defined as the cell set or cells, the P cells are represented using indices from 0 to P−1, and the p-th cell is defined as $\text{Cell}_{P*i+p}$. When a different configuration method is selected for each cell set, this indicates that the configuration method is changed for i, i+1, i+2, . . . . When P is 2 (P=2) at the i-th time point, the cell set may include $\text{Cell}_{2i}$ and $\text{Cell}_{2i+1}$. If the unit for change is defined as J cell sets, this indicates that the configuration method is changed for i+J, i+2J, i+3J, . . . .

As an embodiment of the configuration method, the input index of the frequency path configuration block 150 may be maintained so as to be equal to the output index.

As an embodiment of the configuration method, when M*N inputs are present, an input index corresponding to a fixed offset from the first input index may be sequentially assigned or mapped to an output index.

As an embodiment of the configuration method, the mapping between input and output may be configured depending on a matrix operation. When an input cell set is $In_{(P*i+p)}$, an output cell set is $Out_{(P*i+p)}$, and F is a mapping matrix, the mapping may be defined as shown in Equation (2) below:

$$\begin{pmatrix} Out_{Pi} \\ Out_{Pi+1} \\ \vdots \\ Out_{Pi+(P-1)} \end{pmatrix} = F \cdot \begin{pmatrix} In_{Pi} \\ In_{Pi+1} \\ \vdots \\ In_{Pi+(P-1)} \end{pmatrix} \quad (2)$$

In an embodiment of the matrix-based configuration method, F may be a cyclic shift matrix as shown in Equation (3):

$$F = \begin{bmatrix} 0 & 1 & 0 & \cdots & 0 \\ \vdots & \ddots & \ddots & \ddots & \vdots \\ \vdots & \ddots & \ddots & \ddots & 0 \\ 0 & \ddots & \ddots & \ddots & 1 \\ 1 & 0 & \cdots & \cdots & 0 \end{bmatrix} \quad (3)$$

Also, in the above example based on the cyclic shift matrix, the result of input and output depending on the matrix or configuration method applied at the i-th time point may be defined as shown in Equation (4). Here, mod indicates a modulo operation, and when i mod P is 0, $F^0=I$ is satisfied. Here, I may indicate an identity matrix.

$$\begin{pmatrix} Out_{Pi} \\ Out_{Pi+1} \\ \vdots \\ Out_{Pi+(P-1)} \end{pmatrix} = F^{i \bmod P} \cdot \begin{pmatrix} In_{Pi} \\ In_{Pi+1} \\ \vdots \\ In_{Pi+(P-1)} \end{pmatrix} \quad (4)$$

FIG. 6 is a view illustrating matrices that are defined when P is 4, FIG. 7 is a view illustrating the definitions of $F_0$, $F_1$, $F_2$ and $F_3$ when P is 4, FIG. 8 is a view illustrating an embodiment for defining two matrices in an embodiment in which P is 4, FIG. 9 is a view illustrating the mapping between input and output or a structural definition in addition to the definition of a matrix when P is 4 and i is an even number, and FIG. 10 is a view illustrating the mapping between input and output or a structural definition in addition to the definition of a matrix when P is 4 and i is an odd number.

As an embodiment of the configuration method, a matrix $F_i$ or $F_{i \bmod P}$, which is defined differently depending on the value of i or (i mod P), may be configured. When P is 4 in the above embodiment, embodiments of $F_0$, $F_1$, $F_2$ and $F_3$ may be defined as shown in FIG. 7.

Embodiments for defining two matrices in the embodiment in which P is 4 are described below. When two matrices are defined, a matrix for the case where i is an even number and a matrix for the case where i is an odd number may be defined. Here, a transmission structure in which N is 2 and M is 2 is assumed. That is, the structure in which two wireless channels are present and two MIMOs or transmission antennas are configured for each of the wireless channels is assumed. The first example of the embodiment is as shown in FIG. 8.

Here, $F_0$ and $F_1$ are as shown in Equation (5) below:

$$F_0 = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (5)$$

$$F_1 = \begin{pmatrix} 0 & 0 & 1 & 0 \\ 0 & 0 & 0 & 1 \\ 1 & 0 & 0 & 0 \\ 0 & 1 & 0 & 0 \end{pmatrix}$$

As shown in FIG. 9, when i is an even number, the inputs and the outputs may be mapped so as to correspond to each other. However, when i is an odd number, the inputs and the outputs may be mapped to cross each other, as shown in FIG. 10.

Figure 12:
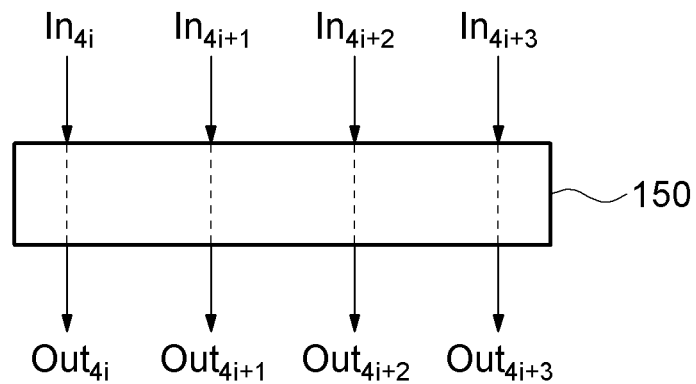
FIG. 12 is a view illustrating the mapping between input and output or a structural definition in addition to the definition of a matrix when P is 2 and i is an even number.
Figure 13:
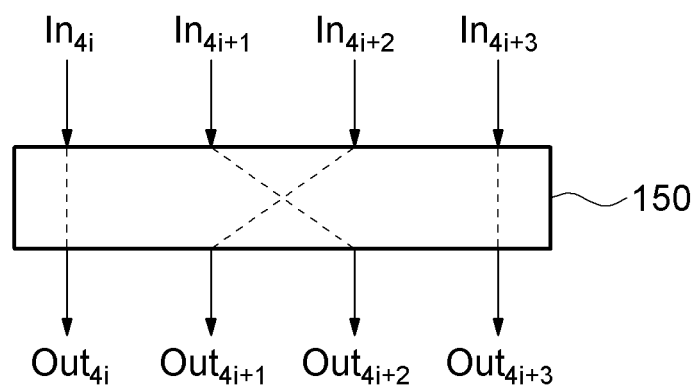
FIG. 13 is a view illustrating the mapping between input and output or a structural definition in addition to the definition of a matrix when P is 2 and i is an odd number.

FIG. 11 is a view illustrating an embodiment for defining two matrices in an embodiment in which P is 2, FIG. 12 is a view illustrating the mapping between input and output or a structural definition in addition to the definition of a matrix when P is 2 and i is an even number, and FIG. 13 a view illustrating the mapping between input and output or a structural definition in addition to the definition of a matrix when P is 2 and i is an odd number.

Based on the embodiment of FIG. 11, $F_0$ and $F_1$ are as shown in Equation (6):

$$F_0 = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (6)$$

$$F_1 = \begin{pmatrix} 1 & 0 & 0 & 0 \\ 0 & 0 & 1 & 0 \\ 0 & 1 & 0 & 0 \\ 0 & 0 & 0 & 1 \end{pmatrix}$$

As illustrated in FIG. 12, when i is an even number, the inputs and the outputs may be mapped to correspond to each other. However, when i is an odd number, the inputs and the outputs may be mapped such that some of them cross each other, as shown in FIG. 13.

That is, when i is an odd number, the matrix may be defined differently in the examples of FIG. 10 and FIG. 13.

As an embodiment of the configuration method, multiple internal frequency path configuration blocks 150, each of which has the same output indices for the M outputs of each of the N first spatial path configuration blocks 130 or the N second path configuration blocks 170, may be formed.

Accordingly, N frequency path configuration blocks 150, the number of which is equal to the number of N first spatial path configuration blocks or N second spatial path configuration blocks, may be formed. As an embodiment, the number of inputs and outputs of the entire frequency path configuration block 150 is (N*M), and N frequency path configuration blocks 150, each having M inputs and M outputs, may be formed therein.

All of the multiple frequency path configuration blocks 150 perform the same operation depending on i. The frequency path configuration block 150 for the N spatial path configuration blocks may be represented using Equation (7) below:

$$\begin{pmatrix} \text{Out}_{Pi,1} \\ \vdots \\ \text{Out}_{Pi+(P-1),1} \\ \vdots \\ \text{Out}_{Pi,N} \\ \vdots \\ \text{Out}_{Pi+(P-1),N} \end{pmatrix} = F \cdot \begin{pmatrix} \text{In}_{Pi,1} \\ \vdots \\ \text{In}_{Pi+(P-1),1} \\ \vdots \\ \text{In}_{Pi,N} \\ \vdots \\ \text{In}_{Pi+(P-1),N} \end{pmatrix} \quad (7)$$

Figure 14:
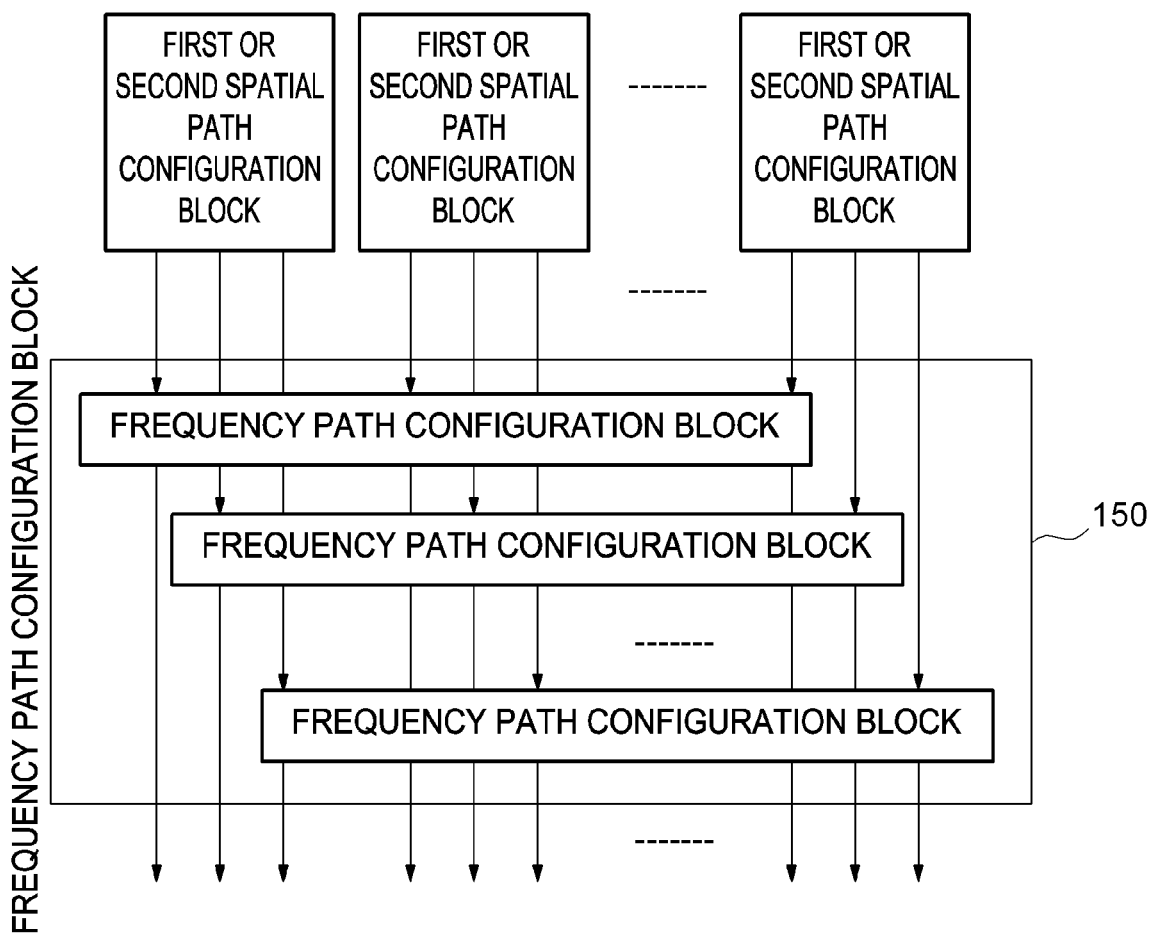
FIG. 14 is a view illustrating that a frequency path configuration block comprises multiple frequency path configuration blocks.

FIG. 14 is a view illustrating that multiple frequency path configuration blocks are configured.

As illustrated in FIG. 14, the outputs having the same index from respective spatial path configuration blocks are input to each of N frequency path configuration blocks 150. If two wireless channels are configured and two antennas are configured for each of the wireless channels as an embodiment, the frequency path configuration block 150 receives four inputs and has four outputs. In this case, N identical frequency path configuration blocks 150, each having two inputs and two outputs, may be formed in the frequency path configuration block.

Hereinafter, an embodiment of a system in which two wireless channels are configured and two antennas are configured for each of the wireless channels is described. Because N is 2, two "first spatial path configuration blocks" are configured, and four cells output therefrom at the i-th time point may be defined as shown in Equation (8):

$$X_{2i,1}(\text{Tx1}) \; X_{2i+1,1}(\text{Tx2}) \; X_{2i,2}(\text{Tx3}) \; X_{2i+1,2}(\text{Tx4}) \quad (8)$$

Here, in order to differentiate the paths of signal-processing processes, Tx1, Tx2, Tx3, and Tx4 are defined. The four cells output from the frequency path configuration block 150 may be defined as shown in Equation (9):

$$g_{2i,1}(\text{Tx1}), \; g_{2i+1,1}(\text{Tx2}), \; g_{2i,2}(\text{Tx3}), \; g_{2i+1,2}(\text{Tx4}) \quad (9)$$

The four cells output from the second spatial path configuration block may be defined as shown in Equation (10):

$$S_{2i,1}(\text{Tx1}), \; S_{2i+1,1}(\text{Tx2}), \; S_{2i,2}(\text{Tx3}), \; S_{2i+1,2}(\text{Tx4}) \quad (10)$$

A description is made by defining the first spatial path configuration block, the second spatial path configuration block, and the frequency path configuration block as a MIMO MAP, a MIMO Precoder, and a cell exchange block, respectively. Embodiments of the first combination of the configuration blocks and the second combination of the configuration blocks are described below.

Figure 15:
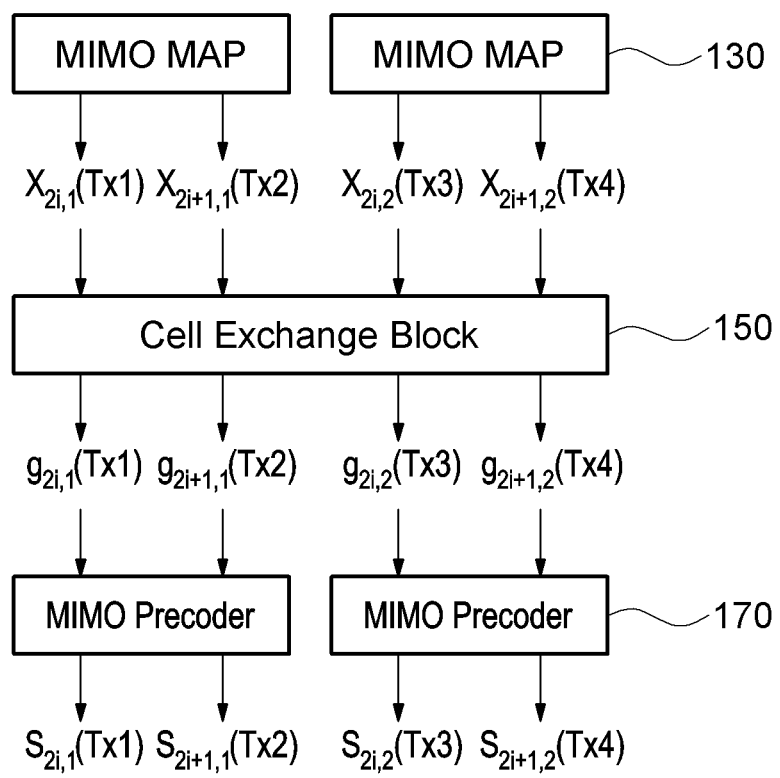
FIG. 15 is a view illustrating an input/output process of a signal configuration apparatus based on a first combination of configuration blocks.
Figure 16:
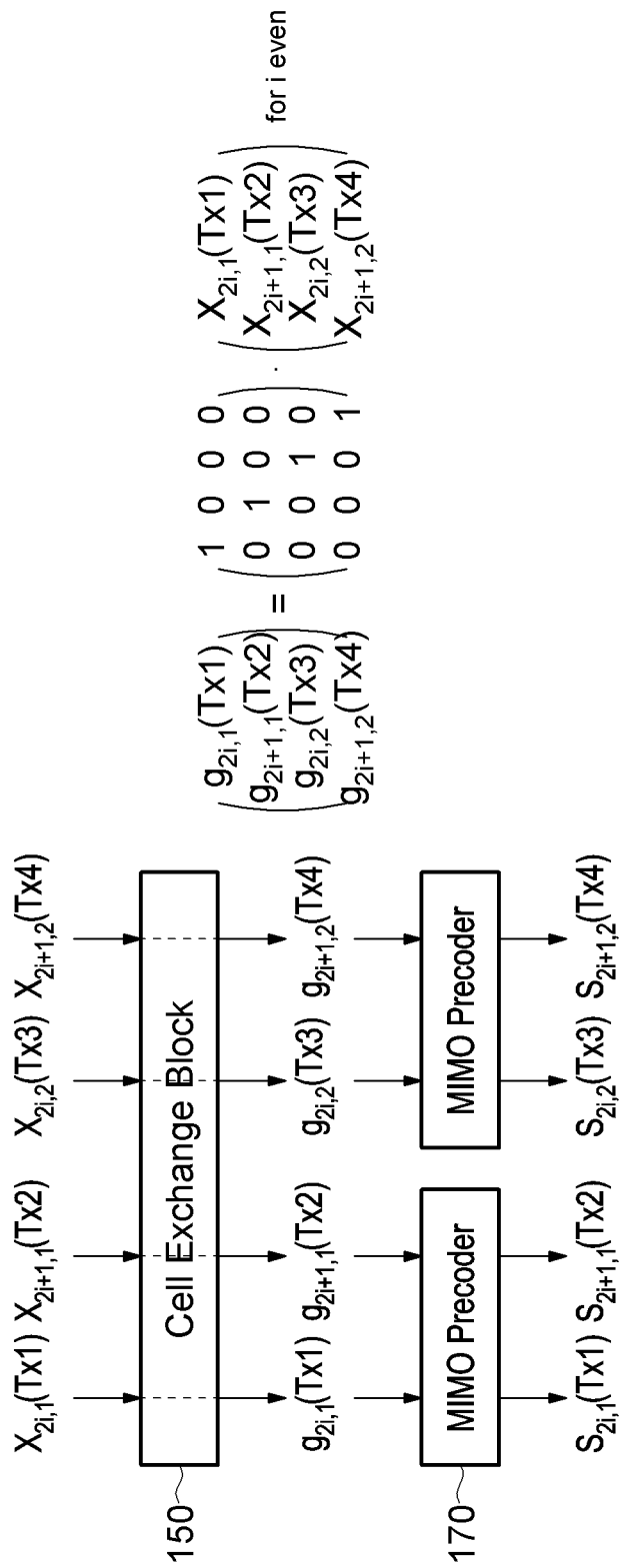
FIG. 16 is a view illustrating an input/output process when i is an even number in the signal configuration apparatus of FIG. 15.
Figure 17:
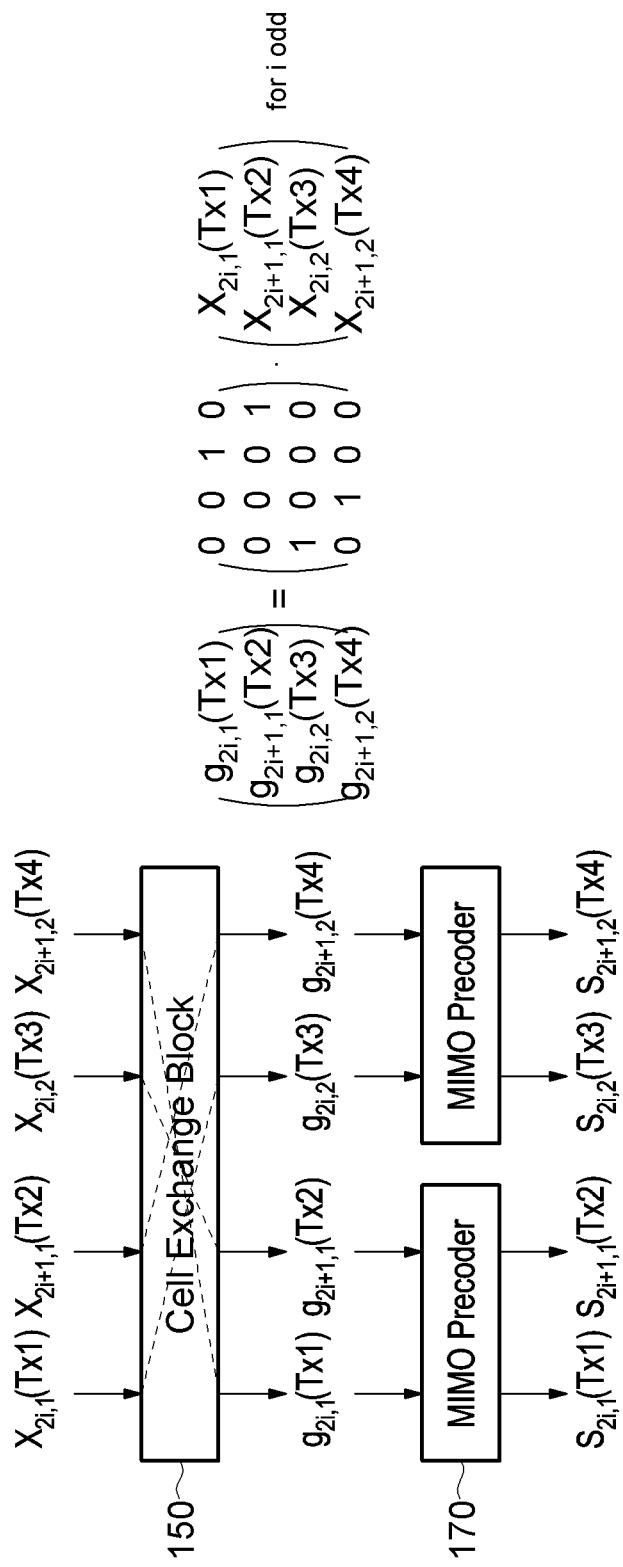
FIG. 17 is a view illustrating an input/output process when i is an odd number in the signal configuration apparatus of FIG. 15.

FIG. 15 is a view illustrating an input/output process of a signal configuration apparatus based on a first combination of configuration blocks, FIG. 16 is a view illustrating an input/output process when i is an even number in the signal configuration apparatus of FIG. 15, and FIG. 17 is a view illustrating an input/output process when i is an odd number in the signal configuration apparatus of FIG. 15.

As illustrated in FIGS. 15 to 17, the frequency path configuration block 150 is configured to change the transmission paths of cells depending on whether i is an even number or an odd number. Two cells output from two MIMO Precoders 170 are mapped to different outputs depending on i. The cell exchange block 150 has four outputs for four inputs. The two cells output from each MIMO precoder 170 are alternately mapped to two wireless channels. Describing the implementation in detail, the cell exchange block 150 may include two identical cell exchange blocks 150, each having two inputs and two outputs, therein. In this case, one of the cell exchange blocks 150 receives $X_{2i,1}$(Tx1) and $X_{2i,2}$(Tx3) as inputs and outputs $g_{2i,1}$(Tx1) and $g_{2i,2}$(Tx3).

The other one of the cell exchange blocks 150 receives $X_{2i+1,1}$(Tx2) and $X_{2i+1,2}$(Tx4) as inputs and outputs $g_{2i+1,1}$(Tx2) and $g_{2i+1,2}$(Tx4).

As another definition method, when i is an even number under the conditions of A∈{1, 2, 3, 4} and B∈{1, 2, 3, 4}, the input TxA is maintained so as to output TxA, and when i is an odd number under the same conditions, the input TxA is changed so as to output TxB. Here B may be calculated as shown in Equation (11) below:

$$B = ((A+1) \bmod 4) + 1 \quad (11)$$

Figure 18:
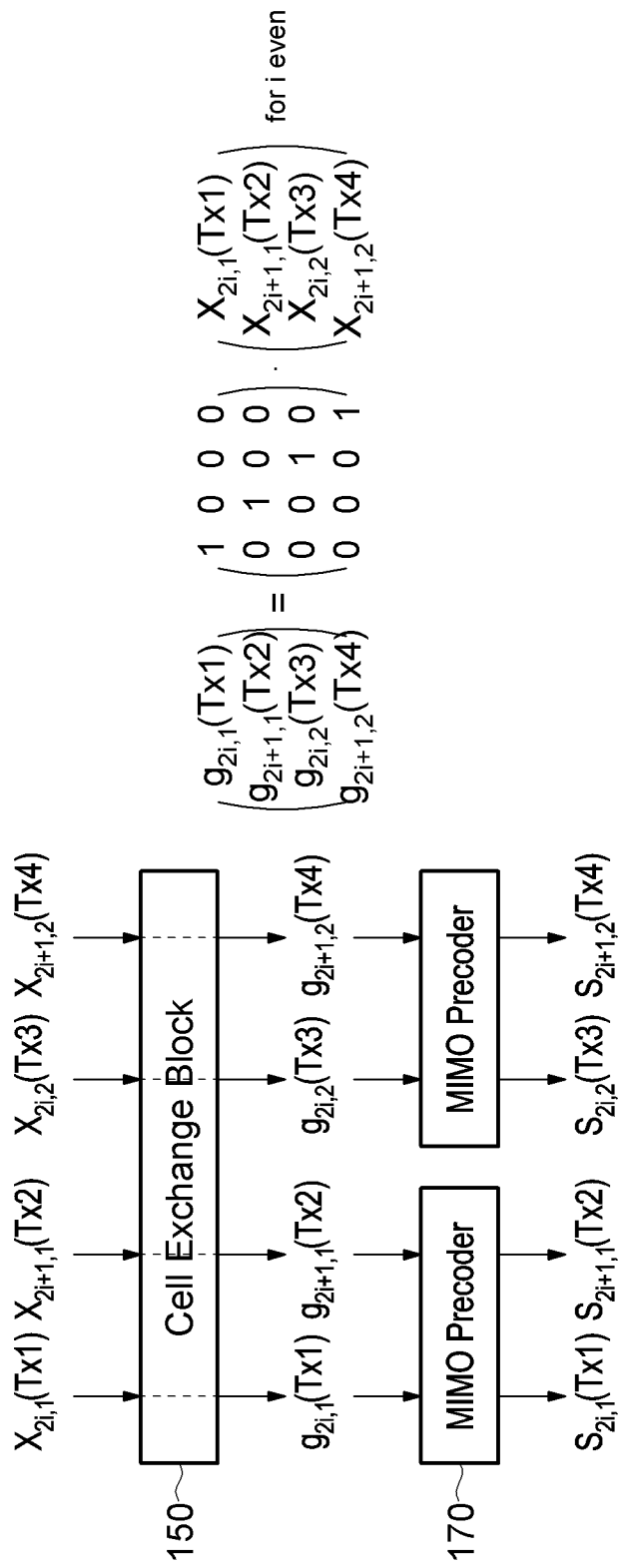
FIG. 18 is a view illustrating an input/output process according to another embodiment when i is an even number in the signal configuration apparatus of FIG. 15.
Figure 19:
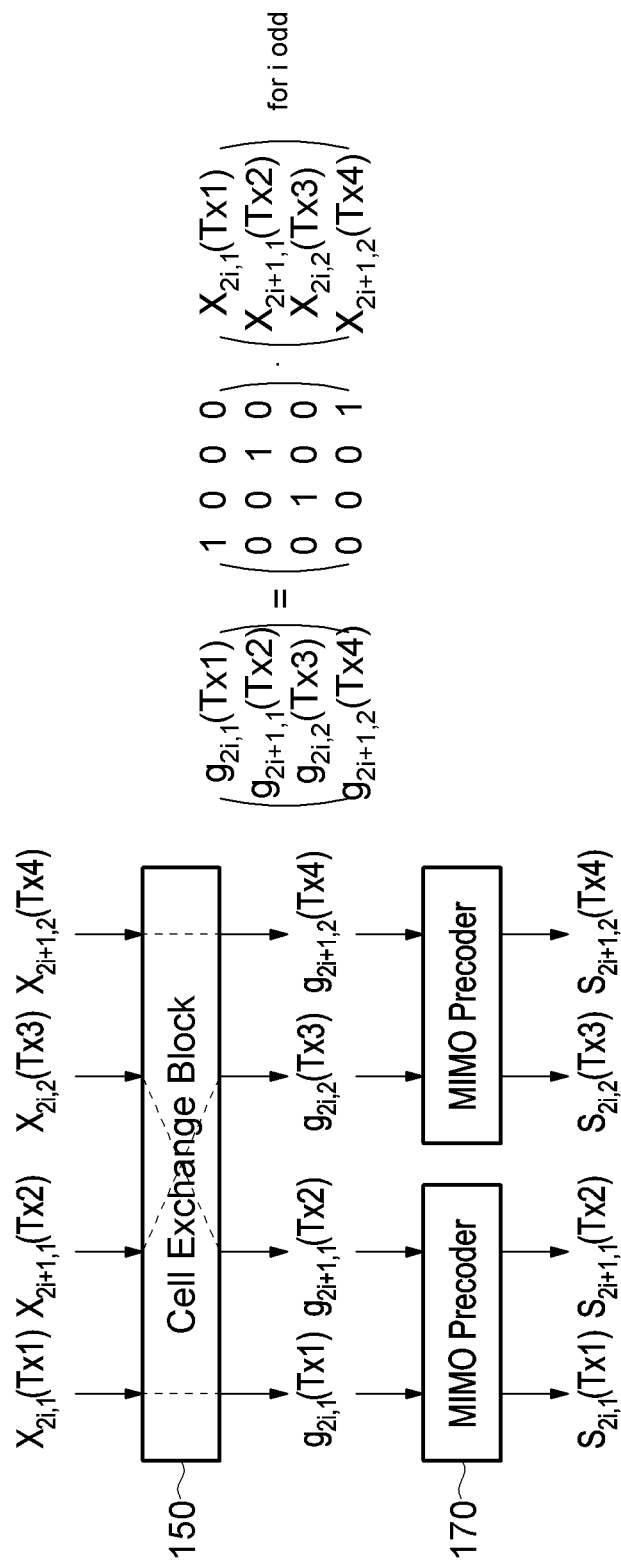
FIG. 19 is a view illustrating an input/output process according to another embodiment when i is an odd number in the signal configuration apparatus of FIG. 15.

FIG. 18 is a view illustrating an input/output process according to another embodiment when i is an even number in the signal configuration apparatus of FIG. 15, and FIG. 19 is a view illustrating an input/output process according to another embodiment when i is an odd number in the signal configuration apparatus of FIG. 15.

As illustrated in FIG. 18 and FIG. 19, the frequency path configuration block 150 is configured to change the transmission paths of cells depending on whether i is an even number or an odd number. One of the cells output from two MIMO precoders 170 is mapped to different outputs depending on i. Accordingly, when i is an odd number, the different cells of the same MIMO precoder 170 are transmitted on different wireless channels, whereby an additional diversity effect may be obtained.

FIG. 20 is a view illustrating an embodiment in which a configuration is determined depending on a frequency path configuration block capable of having four inputs and outputs in a signal configuration apparatus based on a first combination of configuration blocks.

As illustrated in FIG. 20, the configuration may be determined depending on the frequency path configuration block (i mod 4) capable of having four inputs and outputs. Cell mapping or cell exchange may be defined depending on a cyclic matrix.

FIG. 21 is a view illustrating another embodiment in which a configuration is determined depending on a frequency path configuration block capable of having four inputs and outputs in a signal configuration apparatus based on a first combination of configuration blocks.

As illustrated in FIG. 21, the configuration may be determined depending on the frequency path configuration block (i mod 4) capable of having four inputs and outputs. Cell mapping or cell exchange is defined depending on the input and output configuration matrices. Four cells are mapped to different wireless channels and different antennas or are exchanged, whereby the maximum diversity effect may be obtained.

Figure 22:
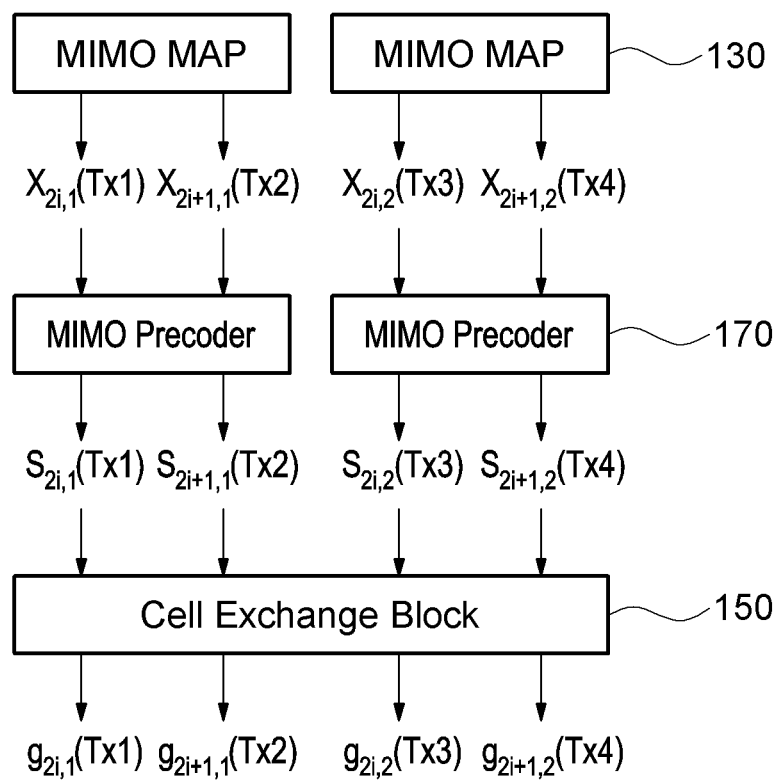
FIG. 22 is a view illustrating an input/output process of a signal configuration apparatus based on a second combination of configuration blocks.
Figure 23:
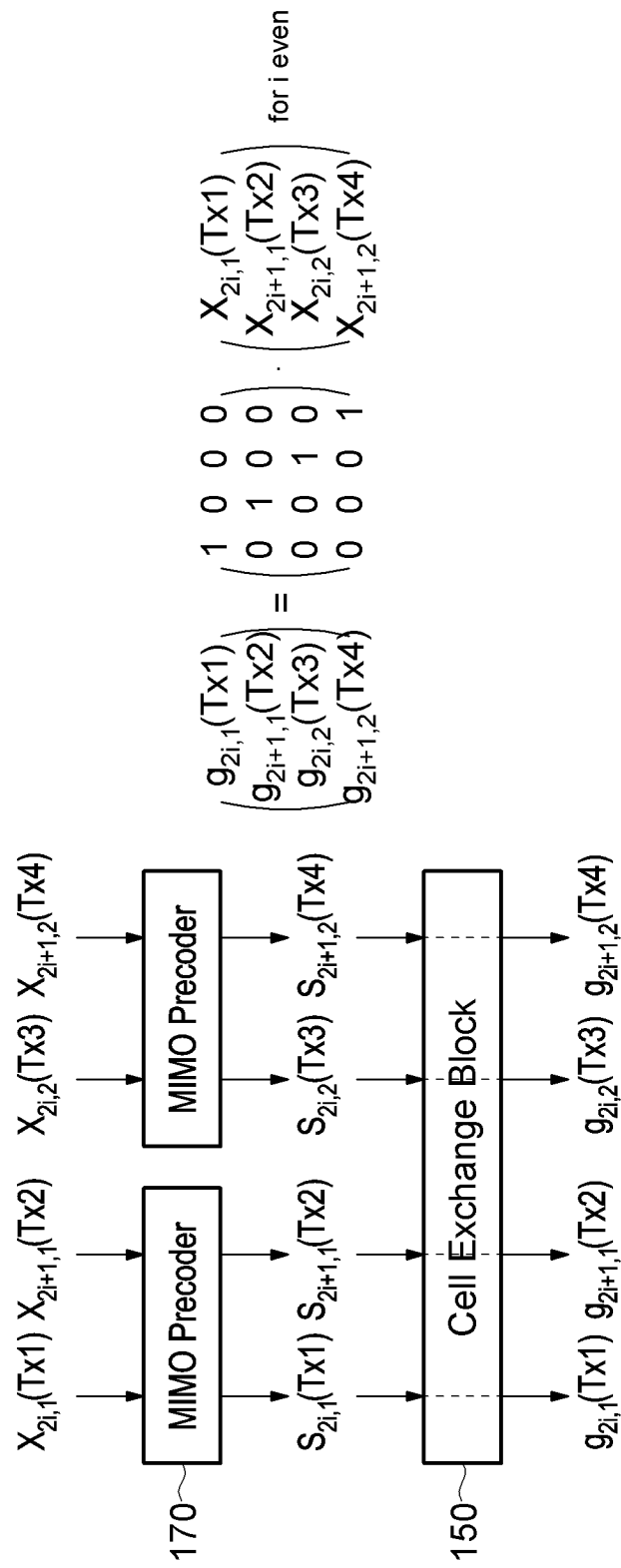
FIG. 23 is a view illustrating an input/output process when i is an even number in the signal configuration apparatus of FIG. 22.
Figure 24:
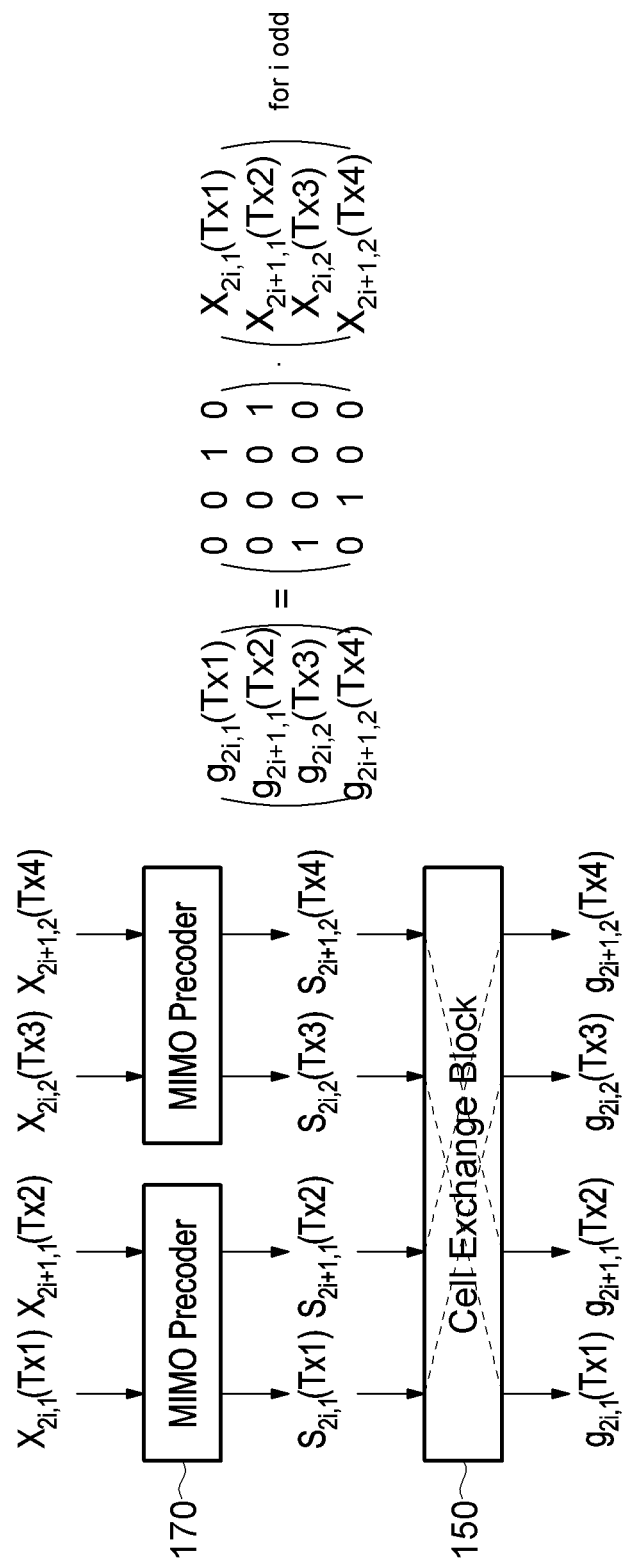
FIG. 24 is a view illustrating an input/output process when i is an odd number in the signal configuration apparatus of FIG. 22.

FIG. 22 is a view illustrating an input/output process of a signal configuration apparatus based on a second combination of configuration blocks, FIG. 23 is a view illustrating an input/output process when i is an even number in the signal configuration apparatus of FIG. 22, and FIG. 24 is a view illustrating an input/output process when i is an odd number in the signal configuration apparatus of FIG. 22.

Referring to FIGS. 22 to 24, the transmission paths of cells are changed depending on whether i is an even number or an odd number. Two cells output from two MIMO precoders 170 are mapped to different outputs depending on i. A cell exchange block 150 has four outputs for four inputs. The two cells output from each MIMO precoder 170 are alternately mapped to two wireless channels. Describing the implementation in detail, the cell exchange block 150 may include two identical cell exchange blocks 150, each having two inputs and two outputs, therein. In this case, one of the cell exchange blocks 150 receives $S2_{2i,1}$(Tx1) and $S_{2i,2}$(Tx3)

as inputs and outputs $g_{2i,1}$(Tx1) and $g_{2i,2}$(Tx3). The other one of the cell exchange blocks 150 receives $S_{2i+1,1}$(Tx2) and $S_{2i+1,2}$(Tx4) as inputs and outputs $g_{2i+1,1}$(Tx2) and $g_{2i+1,2}$(Tx4). As another definition method, when i is an even number under the conditions of A∈{1, 2, 3, 4} and B∈{1, 2, 3, 4}, the input TxA is maintained so as to output TxA, and when i is an odd number under the same conditions, the input TxA is changed so as to output TxB. Here B may be calculated as shown in Equation (11) above.

Figure 25:
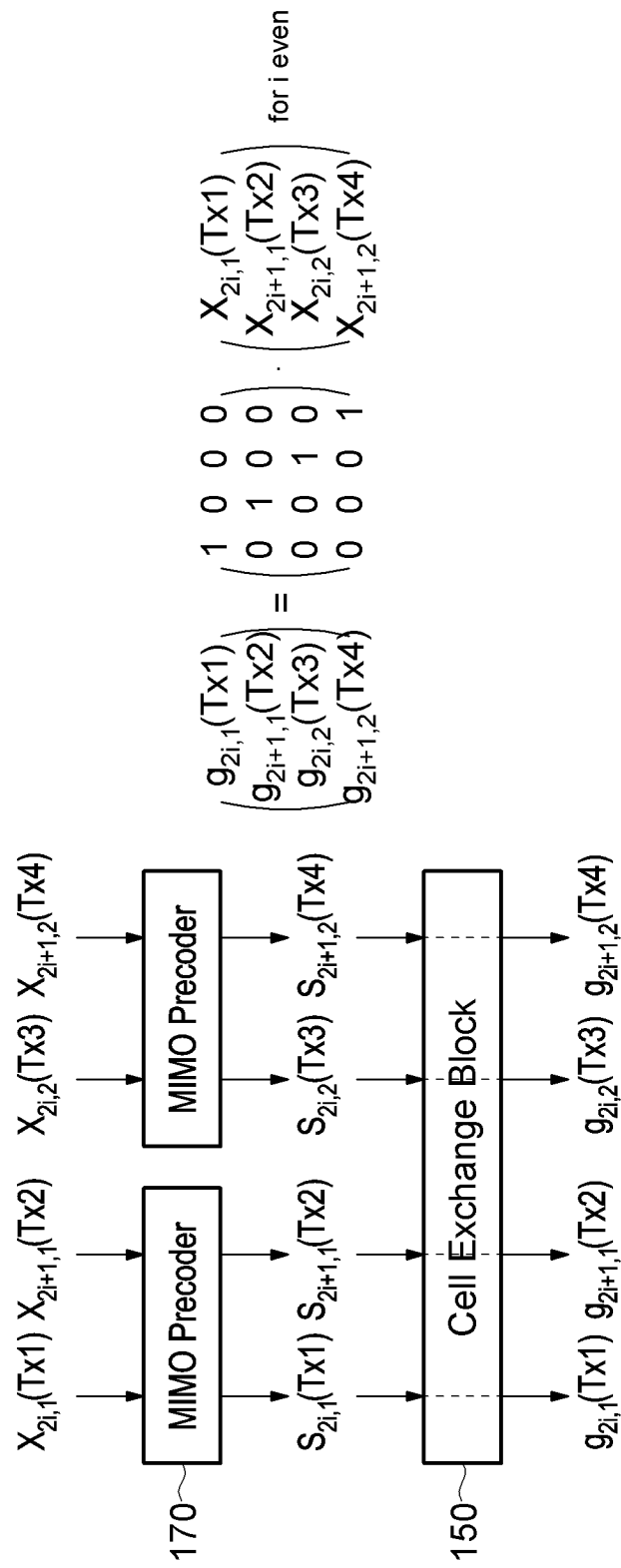
FIG. 25 is a view illustrating an input/output process according to another embodiment when i is an even number in the signal configuration apparatus of FIG. 22.
Figure 26:
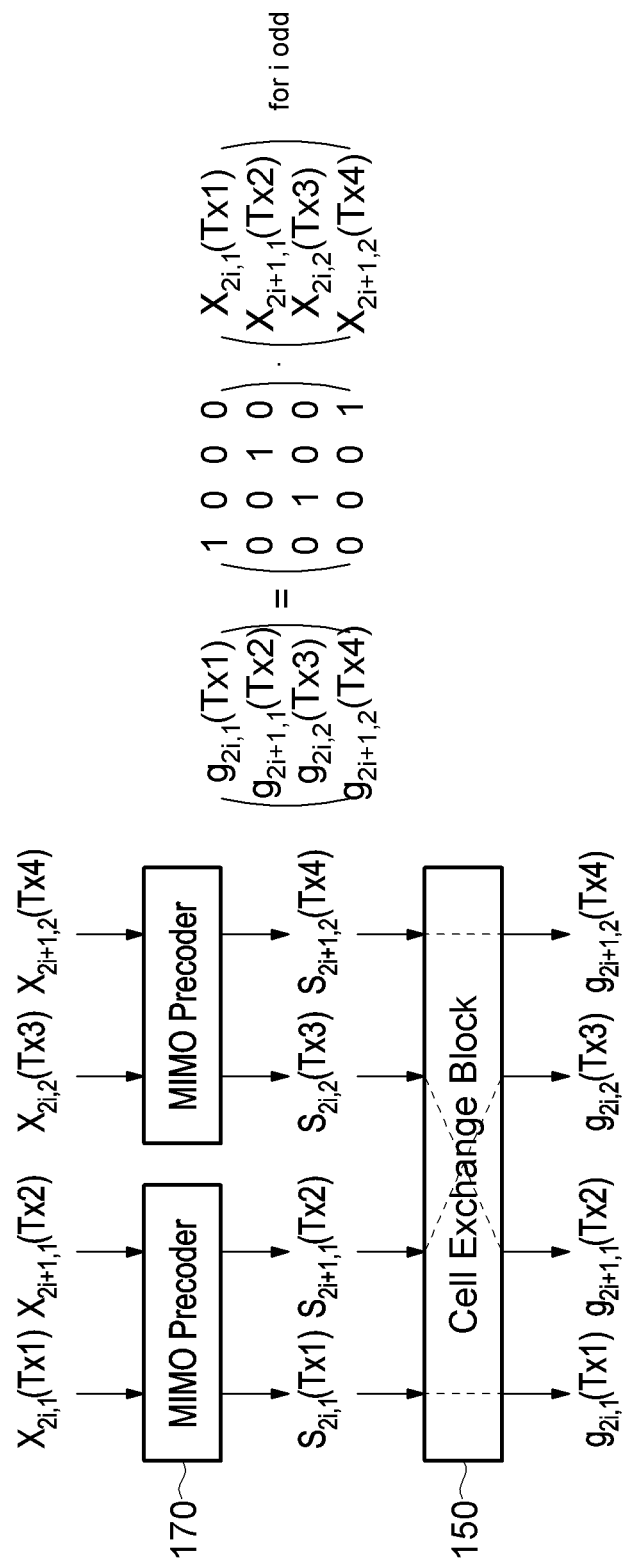
FIG. 26 is a view illustrating an input/output process according to another embodiment when i is an odd number in the signal configuration apparatus of FIG. 22.

FIG. 25 is a view illustrating an input/output process according to another embodiment when i is an even number in the signal configuration apparatus of FIG. 22, and FIG. 26 is a view illustrating an input/output process according to another embodiment when i is an odd number in the signal configuration apparatus of FIG. 22.

Referring to FIG. 25 and FIG. 26, the transmission paths of cells are changed depending on whether i is an even number or an odd number. One of the cells output from two MIMO Precoders 170 is mapped to different outputs depending on i. Accordingly, when i is an odd number, the different cells of the same MIMO precoder 170 are transmitted on different wireless channels, whereby an additional diversity effect may be obtained.

FIG. 27 is a view illustrating an embodiment in which a configuration is determined depending on a frequency path configuration block capable of having four inputs and outputs in a signal configuration apparatus based on a second combination of configuration blocks.

Referring to FIG. 27, an embodiment in which the configuration is determined depending on (i mod 4) of a frequency path configuration block capable of having four inputs and outputs is illustrated. Cell mapping or cell exchange is defined depending on a cyclic matrix.

FIG. 28 is a view illustrating another embodiment in which a configuration is determined depending on a frequency path configuration block capable of having four inputs and outputs in a signal configuration apparatus based on a second combination of configuration blocks.

Referring to FIG. 28, an embodiment in which the configuration is determined depending on (i mod 4) of a frequency path configuration block capable of having four inputs and outputs is illustrated. Cell mapping or cell exchange is defined depending on the input and output configuration matrices. Four cells are mapped to different wireless channels and different antennas or are exchanged, whereby the maximum diversity effect may be obtained.

In an embodiment, multiple configuration methods may be implemented and applied to the system or the apparatus.

A signal transmission apparatus according to an embodiment is required to transfer configuration information in the form of a control message or control information to a reception apparatus in order to announce the configuration of a transmitted signal. Signaling for transferring the control information is formed in the front part of a frame.

In ATSC 3.0, configuration information signaling, such as a subframe of a physical layer, signal processing of a Physical Layer Packet (PLP), and the like, is defined in L1-Basic and L1-Detail, thereby being transferred. The configuration of multiple channels and multiple antennas may be differently applied to each PLP. Accordingly, a method for a spatial path configuration block and/or a frequency path configuration block is included in signaling for an arbitrary PLP transmitted through an arbitrary subframe. Transmitting a signal using one or more channels is called channel bonding. Depending on the frequency path configuration method in channel bonding, plain channel bonding and SNR-averaged channel bonding are present.

The method of determining a signal transmission path in consideration of both multiple channels and multiple antennas may be defined as SNR-averaged MIMO channel bonding. As a method for explicitly signaling the channel bonding method in L1-Detail, 2 bits indicating the channel bonding method may be defined.

FIG. 29 is a view for explaining bits for indicating a signaling method according to an embodiment.

As illustrated in FIG. 29, the value may include 00, 01, 10, and 11. Here, 00 may indicate plain channel bonding, 01 may indicate SNR-averaged channel bonding, 10 may indicate SNR-averaged MIMO channel bonding, and 11 may be a reserved value.

As another embodiment of signaling, signaling is not explicitly specified, but is inexplicitly confirmed using a combination of the values of already defined signaling fields. As an embodiment for this case, when the value of "L1D_num_rf" for defining the number of channels is not 0 and when "L1B_first_sub_mimo" or "L1D_mimo" indicating whether MIMO is used is 1, it may be confirmed that a signal transmission path configuration for multiple channels and multiple antennas is enabled. As an embodiment, when L1D_num_rf=1 and L1B_first_sub_mimo=1 are satisfied for an arbitrary PLP, one of the configuration methods proposed in the present disclosure may be applied to the corresponding PLP in the first subframe. For example, when i is an even number, TxA is maintained to be the same as TxA, whereas when i is an odd number, TxA is changed to TxB. Here, B is calculated through B=((A+1) mod 4+1. As an embodiment, when L1D_num_rf=1 and L1D_mimo=1 are satisfied for an arbitrary PLP, one of the configuration methods proposed in the present disclosure may be applied to the corresponding PLP in a subframe after the first subframe. For example, when i is an even number, TxA is maintained to be the same as TxA, whereas when i is an odd number, TxA is changed to TxB. Here, B is calculated through B=((A+1) mod 4)+1.

As another embodiment for signaling, signaling is not explicitly specified, but is inexplicitly confirmed using a combination of the values of already defined signaling fields. As an embodiment for this case, when the value of "L1D_plp_channel_bonding_format" for defining a channel bonding format is 01 and when "L1B_first_sub_mimo" or "L1D_mimo" indicating whether MIMO is used is 1, it may be confirmed that a signal transmission path configuration for multiple channels and multiple antennas is enabled. As an embodiment, when L1D_plp_channel_bonding_format=1 and L1B_first_sub_mimo=1 are satisfied for an arbitrary PLP, one of the configuration methods proposed in the present disclosure may be applied to the corresponding PLP in the first subframe. For example, when i is an even number, TxA is maintained to be the same as TxA, whereas when i is an odd number, TxA is changed to TxB. Here, B is calculated through B=((A+1) mod 4)+1. As an embodiment, when L1D_plp_channel_bonding_format=1 and L1D_mimo=1 are satisfied for an arbitrary PLP, one of the configuration methods proposed in the present disclosure may be applied to the corresponding PLP in a subframe after the first subframe. For example, when i is an even number, TxA is maintained to be the same as TxA, whereas when i is an odd number, TxA is changed to TxB. Here, B is calculated through B=((A+1) mod 4)+1.

When one or more methods are defined for configuring multiple channels and multiple antennas, the number of signaling bits may be set depending on the number of methods selected for transmission, and an selectable method may be explicitly defined. As an embodiment, when three methods may be used for configuring multiple channels and multiple antennas, the three methods are set to SNR-averaged MIMO channel bonding—option1, SNR-averaged MIMO channel bonding—option2, and SNR-averaged MIMO channel bonding—option3, and the method may be explicitly signaled as shown in FIG. 30.

Figures 30, 31, 32:
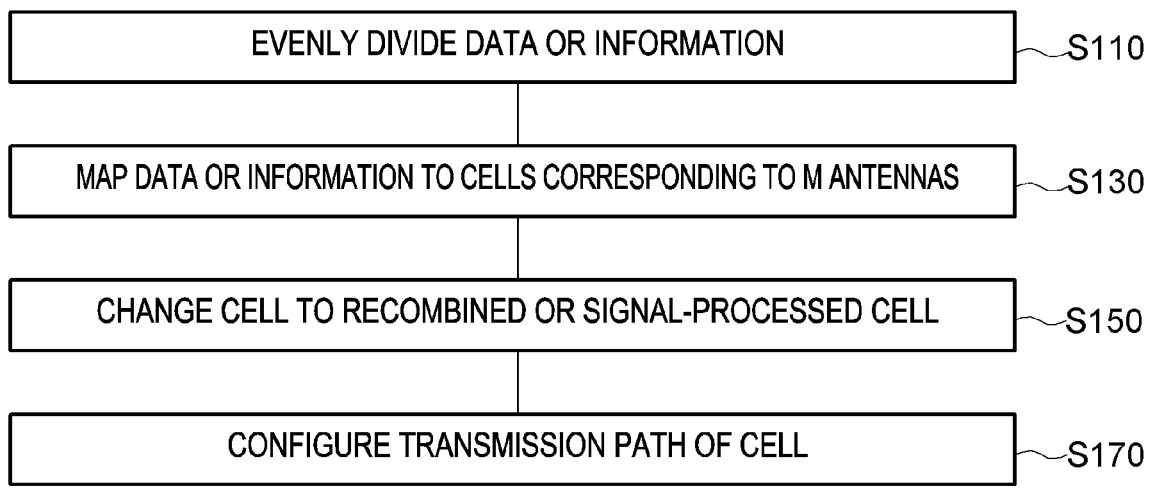
FIG. 30 is a view for explaining bits indicating a signaling method according to another embodiment.
FIG. 31 is a view for explaining a method of signaling a configuration method selected for transmission.
FIG. 32 is a flowchart illustrating a signal configuration method performed by a signal configuration apparatus based on a first combination of configuration blocks according to the present disclosure.

FIG. 30 is a view for explaining bits for indicating a signaling method according to another embodiment.

As illustrated in FIG. 30, the value may include 000, 001, 010, 011, 100, and 101~111. 010 may indicate SNR-averaged MIMO channel bonding—option1, 011 may indicate SNR-averaged MIMO channel bonding—option2, and 100 may indicate SNR-averaged MIMO channel bonding—option3.

When one or more methods are defined as the methods for configuring multiple channels and multiple antennas and when the configuration method selected for transmission is signaled, an existing signaling field or bits may be used without defining additional information bits. When two wireless channels are configured as multiple channels, "L1D_num_rf" is set to 1, and the upper two bits of "L1D_plp_bonded_rf_id", to which three bits are assigned, may be used as signaling for selecting a configuration method. This is because "L1D_plp_bonded_rf_id" has only a value of "001" as a valid value when "L1D_num_rf" is set to 1. Accordingly, a maximum of four different configuration methods may be accommodated.

FIG. 31 is a view for explaining a process of signaling a configuration method selected for transmission.

As illustrated in FIG. 31, when an embodiment of configuration methods of the present disclosure is configured such that the number of multiple channels is two and four different methods are option-1, option-2, option-3, and option-4, the method selected for transmission may be explicitly signaled using the upper two bits, which are a and b, of "L1D_plp_bonded_rf_id". Here, the lower bit, c, indicates the RF channel of channel bonding.

In the above example, "L1B_first_sub_mimo" or "L1D_mimo" is set to 1 for MIMO, and "L1D__num_rf" is set to 1.

FIG. 32 is a flowchart illustrating a signal configuration method performed by a signal configuration apparatus based on a first combination of configuration blocks according to the present disclosure.

As illustrated in FIG. 32, the signal configuration apparatus based on the first combination of configuration blocks may evenly divide data or information forming signal bits or a signal bitstring and transfer the same to N multiple channels using a signal-bit configuration block.

The signal configuration apparatus based on the first combination of configuration blocks may map a coded bitstring, which is generated through coding and signal processing of the data or information forming the signal bits or signal bitstring, to cells corresponding to M antennas using a first spatial path configuration block.

The signal configuration apparatus based on the first combination of configuration blocks may change M cells, to which the coded bitstring is mapped by the first spatial path configuration block, to recombined cells or signal-processed cells using a second spatial path configuration block.

The signal configuration apparatus based on the first combination of configuration blocks may configure the transmission paths of the cells using a frequency path configuration block.

Here, detailed steps may include the operation of the above-described signal configuration apparatus based on the first combination of configuration blocks.

Figure 33:
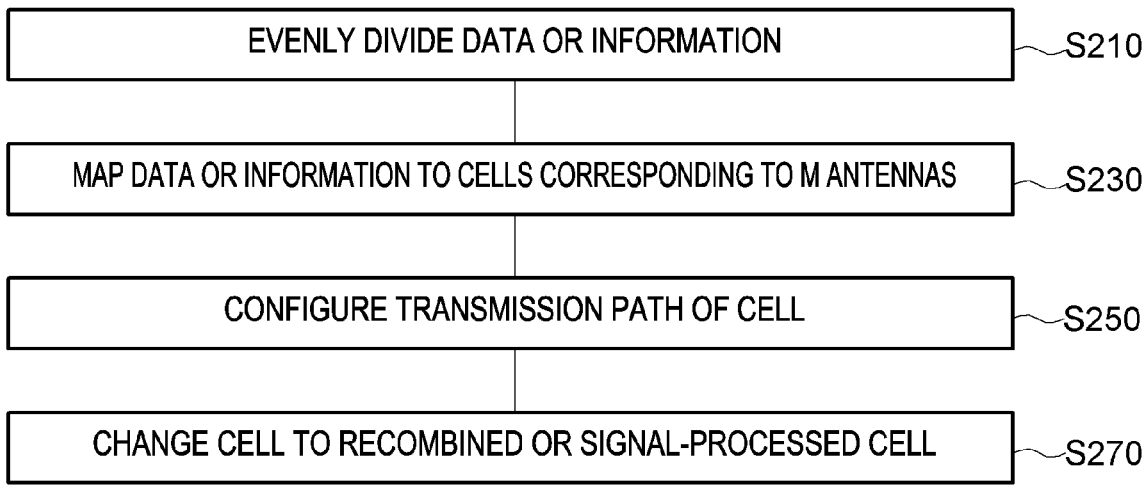
FIG. 33 is a flowchart illustrating a signal configuration method performed by a signal configuration apparatus based on a second combination of configuration blocks according to the present disclosure.

FIG. 33 is a flowchart illustrating a signal configuration method performed by a signal configuration apparatus based on a second combination of configuration blocks according to the present disclosure.

As illustrated in FIG. 33, the signal configuration apparatus based on the second combination of configuration blocks may evenly divide data or information forming signal bits or a signal bitstring and transfer the same to N multiple channels using a signal-bit configuration block.

The signal configuration apparatus based on the second combination of configuration blocks may map a coded bitstring, which is generated through coding and signal processing of the data or information forming the signal bits or signal bitstring, to cells corresponding to M antennas using a first spatial path configuration block.

The signal configuration apparatus based on the second combination of configuration blocks may configure the transmission paths of the cells using a frequency path configuration block.

The signal configuration apparatus based on the second combination of configuration blocks may change the cells output by the frequency path configuration block to recombined cells or signal-processed cells using a second spatial path configuration block.

The signal configuration apparatus according to an embodiment may alternatively perform a signal configuration method from which the function of the second spatial path configuration block is deleted.

Figure 34:
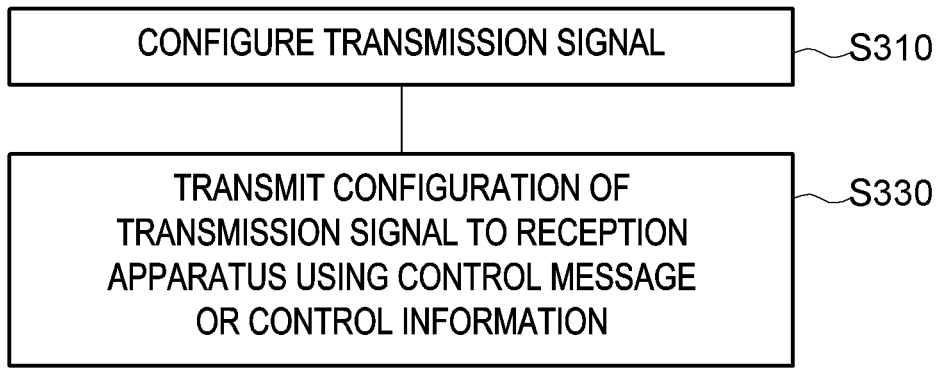
FIG. 34 is a flowchart illustrating a signal transmission method performed by a signal transmission apparatus according to the present disclosure.

FIG. 34 is a flowchart illustrating a signal transmission method performed by a signal transmission apparatus according to the present disclosure.

As illustrated in FIG. 34, a signal transmission apparatus may evenly divide data or information forming signal bits or a signal bitstring and transfer the same to N multiple channels using a signal-bit configuration block, map a coded bitstring, generated through coding and signal processing of the data or information forming the signal bits or the signal bitstring, to cells corresponding to M antennas using a first spatial path configuration block, and configure the transmission paths of the cells using a frequency path configuration block, thereby configuring a transmission signal.

The signal transmission apparatus may transfer the configuration of the transmission signal to a reception apparatus using a control message or control information.

The signal configuration apparatus or the signal transmission apparatus according to an embodiment may be implemented in a computer system including a computer-readable recording medium.

Figure 35:
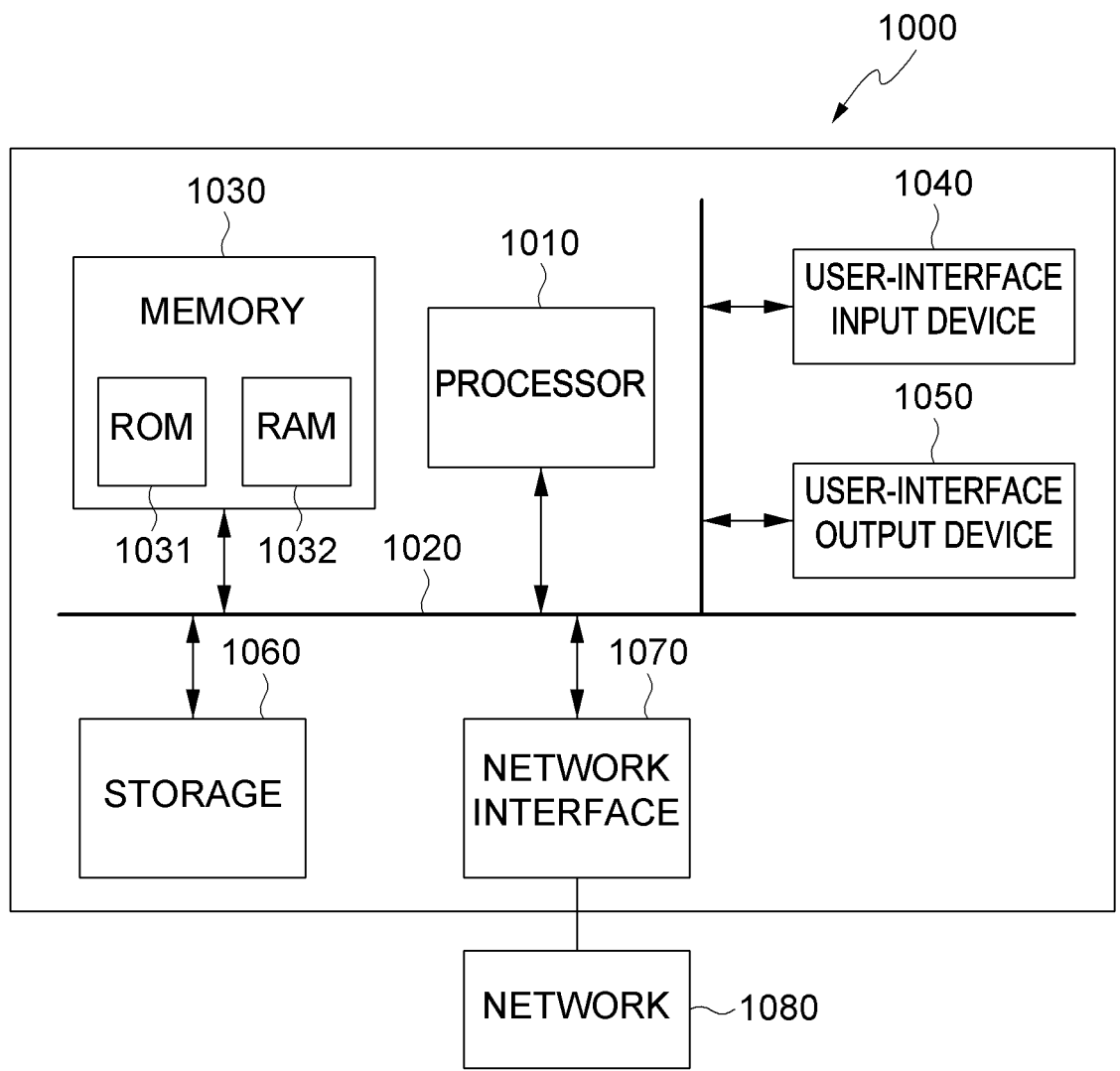
FIG. 35 is a block diagram illustrating the configuration of a computer system according to an embodiment.

FIG. 35 is a block diagram illustrating the configuration of a computer system according to an embodiment.

Referring to FIG. 35, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the signal configuration apparatus.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a signal configuration method according to an embodiment. Specifically, the memory may store multiple applications running in the signal configuration apparatus and data and instructions for operation of the signal configuration apparatus.

The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

The present disclosure may obtain a diversity effect by defining an optimal signal configuration method for a system configured with multiple channels and multiple antennas.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for signal configuration, comprising:
    evenly dividing, by a signal-bit configuration block, data or information forming signal bits or a signal bitstring and transferring the divided data or information to N multiple channels;
    mapping, by a first spatial path configuration block, a coded bitstring, which is generated through coding and signal processing of the data or information forming the signal bits or the signal bitstring, to cells corresponding to M antennas; and
    configuring, by a frequency path configuration block, transmission paths of the cells,
    wherein the method further comprises changing, by a second spatial path configuration block, M cells, to which the coded bitstring is mapped by the first spatial path configuration block, to recombined cells or signal-processed cells.

2. The method of claim 1, further comprising:
    changing, by the second spatial path configuration block, cells output by the frequency path configuration block to recombined cells or signal-processed cells.

3. The method of claim 1, wherein cells input to the frequency path configuration block are connected with cells output therefrom in a one-to-one manner.

4. The method of claim 1, wherein the frequency path configuration block comprises a number of frequency path configuration blocks equal to a number of second spatial path configuration blocks.

5. The method of claim 1, wherein the second spatial path configuration block recombines the cells by combining in-phase components and quadrature components of the cells when M is 2.

6. The method of claim 1, wherein cells input to the frequency path configuration block are transmitted on different wireless channels.

7. An apparatus for signal configuration, comprising:
    memory in which a control program for signal configuration is stored; and
    a processor for executing the control program stored in the memory,
    wherein the processor evenly divides data or information forming signal bits or a signal bitstring and transfers the divided data or information to N multiple channels using a signal-bit configuration block, maps a coded bitstring, which is generated through coding and signal processing of the data or information forming the signal bits or the signal bitstring, to cells corresponding to M antennas using a first spatial path configuration block, and configures transmission paths of the cells using a frequency path configuration block, and
    wherein the processor changes M cells, to which the coded bitstring is mapped by the first spatial path configuration block, to recombined cells or signal-processed cells using a second spatial path configuration block.

8. The apparatus of claim 7, wherein the processor changes cells output by the frequency path configuration block to recombined cells or signal-processed cells using the second spatial path configuration block.

9. The apparatus of claim 7, wherein cells input to the frequency path configuration block are connected with cells output therefrom in a one-to-one manner.

10. The apparatus of claim 7, wherein the processor configures the frequency path configuration block so as to comprise a number of frequency path configuration blocks equal to a number of second spatial path configuration blocks.

11. The apparatus of claim 7, wherein the processor recombines the cells by combining in-phase components and quadrature components of the cells when M is 2.

12. The apparatus of claim 7, wherein the processor configures the frequency path configuration block such that cells input thereto are transmitted on different wireless channels.

13. A method for signal transmission, comprising:
    configuring a transmission signal in such a way that a signal-bit configuration block evenly divides data or information forming signal bits or a signal bitstring and transfers the divided data or information to N multiple channels, a first spatial path configuration block maps a coded bitstring, which is generated through coding and signal processing of the data or information forming the signal bits or the signal bitstring, to cells corresponding to M antennas, and a frequency path configuration block configures transmission paths of the cells; and transmitting a configuration of the transmission signal to a reception apparatus using a control message or control information, wherein the method further comprises changing, by a second spatial path configuration block, M cells, to which the coded bitstring is mapped by the first spatial path configuration block, to recombined cells or signal-processed cells.

14. The method of claim 13, further comprising:

changing, by the second spatial path configuration block, cells output by the frequency path configuration block to recombined cells or signal-processed cells.

15. The method of claim 13, wherein cells input to the frequency path configuration block are connected with cells output therefrom in a one-to-one manner.

16. The method of claim 13, wherein the frequency path configuration block comprises a number of frequency path configuration blocks equal to a number of second spatial path configuration blocks.

17. The method of claim 13, wherein the second spatial path configuration block recombines the cells by combining in-phase components and quadrature components of the cells when M is 2.

* * * * *